(12) United States Patent
Harvey et al.

(10) Patent No.: US 12,120,838 B2
(45) Date of Patent: Oct. 15, 2024

(54) SEMANTIC LABELING ANALYSIS

(71) Applicant: PassiveLogic, Inc., Salt Lake City, UT (US)

(72) Inventors: Troy Aaron Harvey, Brighton, UT (US); Jeremy David Fillingim, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 349 days.

(21) Appl. No.: 17/409,636

(22) Filed: Aug. 23, 2021

(65) Prior Publication Data

US 2022/0066754 A1  Mar. 3, 2022

Related U.S. Application Data

(60) Provisional application No. 63/070,460, filed on Aug. 26, 2020.

(51) Int. Cl.
   *H05K 7/14* (2006.01)
   *F24F 11/32* (2018.01)
   (Continued)

(52) U.S. Cl.
   CPC ............ *H05K 7/1465* (2013.01); *F24F 11/32* (2018.01); *F24F 11/49* (2018.01); *F24F 11/63* (2018.01);
   (Continued)

(58) Field of Classification Search
   CPC ... G06F 8/436; G06F 8/53; G06F 8/74; G06F 1/3209; G06F 1/3246; G06F 3/04186; G06F 3/0482; G06F 3/04847; G06F 3/147; G06F 8/51; G06F 9/4418; G06F 30/12; G06F 30/13; G06F 30/18; G06F 30/392;
   (Continued)

(56) References Cited

U.S. PATENT DOCUMENTS

| | | | |
|---|---|---|---|
| 4,353,653 A | 10/1982 | Zimmerman | |
| 5,208,765 A | 5/1993 | Turnbull | |

(Continued)

FOREIGN PATENT DOCUMENTS

| | | | |
|---|---|---|---|
| CN | 103926912 A | 7/2014 | |
| CN | 206002869 U | 3/2017 | |
| CN | 206489622 U | 9/2017 | |
| JP | 6301341 B2 | 3/2018 | |
| WO | 2008016500 A3 | 3/2008 | |
| WO | 2012019328 A1 | 2/2012 | |

OTHER PUBLICATIONS

Zhang, H., Yan, Q., & Wen, Z. (2020). Information modeling for cyber-physical production system based on digital twin and AutomationML. The international journal of advanced manufacturing technology, 107(3), 1927-1945. (Year: 2020).*

(Continued)

*Primary Examiner* — Matthew J Brophy

(57) ABSTRACT

Tools and techniques are described to create an interface that can translate a device language into an internal language, and describe the device to the controller in terms of actors and quanta such that when a device is attached to a controller, the controller can understand what the device does and why it does it. This internal language can then be translated back to a natural language, such as English. This allows the controller to track errors, determine what upstream or downstream device and action of the device caused the error, and to track many different facts of the system that allow for detailed reports.

20 Claims, 14 Drawing Sheets

(51) Int. Cl.

| | | |
|---|---|---|
| *F24F 11/49* | (2018.01) | |
| *F24F 11/63* | (2018.01) | |
| *F24F 11/88* | (2018.01) | |
| *G01R 31/55* | (2020.01) | |
| *G05B 13/02* | (2006.01) | |
| *G05B 15/02* | (2006.01) | |
| *G05B 19/048* | (2006.01) | |
| *G05B 23/02* | (2006.01) | |
| *G06F 1/3209* | (2019.01) | |
| *G06F 1/3246* | (2019.01) | |
| *G06F 3/041* | (2006.01) | |
| *G06F 3/0482* | (2013.01) | |
| *G06F 3/04847* | (2022.01) | |
| *G06F 3/147* | (2006.01) | |
| *G06F 8/41* | (2018.01) | |
| *G06F 8/51* | (2018.01) | |
| *G06F 8/53* | (2018.01) | |
| *G06F 8/74* | (2018.01) | |
| *G06F 9/4401* | (2018.01) | |
| *G06F 30/12* | (2020.01) | |
| *G06F 30/13* | (2020.01) | |
| *G06F 30/18* | (2020.01) | |
| *G06Q 30/0283* | (2023.01) | |
| *H02J 3/00* | (2006.01) | |
| *H04B 3/46* | (2015.01) | |
| *H04L 43/50* | (2022.01) | |
| *H04L 67/12* | (2022.01) | |
| *H04L 67/125* | (2022.01) | |
| *H04L 67/75* | (2022.01) | |
| *H04M 3/30* | (2006.01) | |
| *H04W 4/80* | (2018.01) | |
| *H04W 84/00* | (2009.01) | |
| *G06F 30/392* | (2020.01) | |
| *G06F 111/04* | (2020.01) | |
| *G06F 111/16* | (2020.01) | |
| *G06F 113/04* | (2020.01) | |
| *G06F 113/16* | (2020.01) | |
| *G06F 115/12* | (2020.01) | |

(52) U.S. Cl.
CPC ............. *F24F 11/88* (2018.01); *G01R 31/55* (2020.01); *G05B 13/0265* (2013.01); *G05B 15/02* (2013.01); *G05B 19/048* (2013.01); *G05B 23/0216* (2013.01); *G05B 23/0264* (2013.01); *G05B 23/0272* (2013.01); *G06F 1/3209* (2013.01); *G06F 1/3246* (2013.01); *G06F 3/04186* (2019.05); *G06F 3/0482* (2013.01); *G06F 3/04847* (2013.01); *G06F 3/147* (2013.01); *G06F 8/436* (2013.01); *G06F 8/51* (2013.01); *G06F 8/53* (2013.01); *G06F 8/74* (2013.01); *G06F 9/4418* (2013.01); *G06F 30/12* (2020.01); *G06F 30/13* (2020.01); *G06F 30/18* (2020.01); *G06Q 30/0283* (2013.01); *H02J 3/00* (2013.01); *H04B 3/46* (2013.01); *H04L 43/50* (2013.01); *H04L 67/12* (2013.01); *H04L 67/125* (2013.01); *H04L 67/75* (2022.05); *H04M 3/305* (2013.01); *H04W 4/80* (2018.02); *H04W 84/00* (2013.01); *H05K 7/1468* (2013.01); *H05K 7/1477* (2013.01); *H05K 7/1481* (2013.01); *G06F 30/392* (2020.01); *G06F 2111/04* (2020.01); *G06F 2111/16* (2020.01); *G06F 2113/04* (2020.01); *G06F 2113/16* (2020.01); *G06F 2115/12* (2020.01); *H02J 2310/12* (2020.01)

(58) Field of Classification Search
CPC ............. G06F 2111/04; G06F 2111/16; G06F 2113/04; G06F 2113/16; G06F 2115/12; G05B 15/00–02; G05B 13/0265; G05B 19/048; G05B 23/0216; G05B 23/0264; G05B 23/0272; H05K 7/1465; H05K 7/1468; H05K 7/1477; H05K 7/1481; F24F 11/32; F24F 11/49; F24F 11/63; F24F 11/88; G01R 31/55; G06Q 30/0283; H02J 3/00; H02J 2310/12; H04B 3/46; H04L 43/50; H04L 67/12; H04L 67/125; H04L 67/75; H04M 3/305; H04W 4/80; H04W 84/00

See application file for complete search history.

(56) References Cited

U.S. PATENT DOCUMENTS

| | | | |
|---|---|---|---|
| 5,530,643 | A | 6/1996 | Hodorowski |
| 6,275,962 | B1 | 8/2001 | Fuller et al. |
| 6,301,341 | B1 | 10/2001 | Gizara et al. |
| 6,437,692 | B1 | 8/2002 | Petite et al. |
| 6,606,731 | B1 | 8/2003 | Baum et al. |
| 6,645,066 | B2 | 11/2003 | Gutta et al. |
| 6,813,777 | B1 | 11/2004 | Weinberger et al. |
| 6,891,838 | B1 | 5/2005 | Petite et al. |
| 7,102,502 | B2 | 9/2006 | Autret |
| 7,248,603 | B1 | 7/2007 | Grunkemeyer et al. |
| 7,304,855 | B1 | 12/2007 | Milligan et al. |
| 7,578,135 | B2 | 8/2009 | Mattheis |
| 7,587,250 | B2 | 9/2009 | Coogan et al. |
| 7,729,882 | B2 | 6/2010 | Seem |
| 7,734,572 | B2 | 6/2010 | Wiemeyer et al. |
| 7,835,431 | B2 | 11/2010 | Belge |
| 7,917,232 | B2 | 3/2011 | McCoy et al. |
| 8,024,054 | B2 | 9/2011 | Mairs et al. |
| 8,099,178 | B2 | 1/2012 | Mairs et al. |
| 8,503,943 | B2 | 8/2013 | Spanhake |
| 8,628,239 | B2 | 1/2014 | Merrow et al. |
| 8,643,476 | B2 | 2/2014 | Pinn et al. |
| 8,749,959 | B2 | 6/2014 | Riley et al. |
| 8,782,619 | B2 | 7/2014 | Wu et al. |
| 8,925,358 | B2 | 1/2015 | Kasper |
| 9,441,847 | B2 | 9/2016 | Grohman |
| 9,521,724 | B1 | 12/2016 | Berry et al. |
| 9,544,209 | B2 | 1/2017 | Gielarowski et al. |
| 9,602,301 | B2 | 3/2017 | Averitt |
| 9,664,400 | B2 | 5/2017 | Wroblewski et al. |
| 9,671,777 | B1 * | 6/2017 | Aichele .................. B25J 9/1666 |
| 9,678,494 | B2 | 6/2017 | Hyde et al. |
| 9,740,385 | B2 | 8/2017 | Fadell et al. |
| 9,791,872 | B2 | 10/2017 | Wang et al. |
| 9,857,238 | B2 | 1/2018 | Malhotra et al. |
| 9,860,961 | B2 | 1/2018 | Chemel et al. |
| 9,952,573 | B2 | 4/2018 | Sloo et al. |
| 10,042,730 | B2 | 8/2018 | Zebian |
| 10,094,586 | B2 | 10/2018 | Pavlovski et al. |
| 10,223,721 | B1 | 3/2019 | Bhatia |
| 10,334,758 | B1 | 6/2019 | Ramirez et al. |
| 10,512,143 | B1 | 12/2019 | Ikehara et al. |
| 10,528,016 | B2 | 1/2020 | Noboa |
| 10,557,889 | B2 | 2/2020 | Montoya et al. |
| 10,558,183 | B2 | 2/2020 | Piaskowski et al. |
| 10,558,248 | B2 | 2/2020 | Adrian |
| 10,627,124 | B2 | 4/2020 | Walser et al. |
| 10,640,211 | B2 | 5/2020 | Whitten et al. |
| 10,672,293 | B2 | 6/2020 | Labutov et al. |
| 10,687,435 | B2 | 6/2020 | Adrian et al. |
| 10,736,228 | B2 | 8/2020 | Kho et al. |
| 10,761,516 | B2 * | 9/2020 | Sinha .................. G05B 19/048 |
| 10,892,946 | B2 | 1/2021 | Costa et al. |
| 10,900,489 | B2 | 1/2021 | Rendusara et al. |
| 10,942,871 | B2 | 3/2021 | Cawse et al. |
| 10,943,444 | B2 | 3/2021 | Boyd et al. |
| 10,966,068 | B2 | 3/2021 | Tramiel et al. |

(56) References Cited

U.S. PATENT DOCUMENTS

| | | | |
|---|---|---|---|
| 10,966,342 B2 | 3/2021 | Airsey et al. | |
| 10,969,133 B2 | 4/2021 | Harvey | |
| 11,005,870 B2* | 5/2021 | Yan | G06F 21/554 |
| 11,073,976 B2* | 7/2021 | Park | G05B 15/02 |
| 11,088,989 B2 | 8/2021 | Gao et al. | |
| 11,119,882 B2* | 9/2021 | Rakshit | G06F 11/3051 |
| 11,131,473 B2* | 9/2021 | Risbeck | F24F 11/70 |
| 11,164,159 B2* | 11/2021 | Ma | G07C 9/22 |
| 11,262,741 B2* | 3/2022 | Strand | G05B 23/027 |
| 11,269,306 B2* | 3/2022 | Risbeck | F24F 8/10 |
| 11,294,254 B2 | 4/2022 | Patterson et al. | |
| 11,353,853 B2* | 6/2022 | Sinha | H04L 43/06 |
| 11,385,613 B2 | 7/2022 | Ludwig et al. | |
| 11,468,408 B2* | 10/2022 | Ma | G06Q 10/1095 |
| 11,677,576 B2* | 6/2023 | Thakur | G05B 15/02 700/275 |
| 11,733,663 B2* | 8/2023 | Bhattacharya | G05B 15/02 705/305 |
| 2004/0236547 A1 | 11/2004 | Rappaport et al. | |
| 2005/0010421 A1 | 1/2005 | Watanabe et al. | |
| 2005/0040247 A1 | 2/2005 | Pouchak | |
| 2007/0096902 A1 | 5/2007 | Seeley et al. | |
| 2007/0162288 A1 | 7/2007 | Springhart et al. | |
| 2008/0270951 A1 | 10/2008 | Anand et al. | |
| 2008/0277486 A1 | 11/2008 | Seem et al. | |
| 2009/0189764 A1 | 7/2009 | Keller et al. | |
| 2009/0195064 A1 | 8/2009 | Joseph et al. | |
| 2010/0005218 A1 | 1/2010 | Gower et al. | |
| 2010/0025483 A1 | 2/2010 | Hoeynck et al. | |
| 2010/0131933 A1 | 5/2010 | Kim et al. | |
| 2010/0162037 A1 | 6/2010 | Maule et al. | |
| 2010/0237891 A1 | 9/2010 | Lin et al. | |
| 2011/0087988 A1 | 4/2011 | Ray et al. | |
| 2011/0125930 A1 | 5/2011 | Tantos et al. | |
| 2012/0102472 A1 | 4/2012 | Wu et al. | |
| 2012/0221986 A1 | 8/2012 | Whitford et al. | |
| 2012/0233595 A1 | 9/2012 | Ghanathe et al. | |
| 2013/0343207 A1 | 12/2013 | Cook et al. | |
| 2013/0343388 A1 | 12/2013 | Stroud et al. | |
| 2013/0343389 A1 | 12/2013 | Stroud et al. | |
| 2013/0343390 A1 | 12/2013 | Moriarty et al. | |
| 2013/0346987 A1 | 12/2013 | Raney et al. | |
| 2014/0088772 A1 | 3/2014 | Lelkens | |
| 2014/0101082 A1 | 4/2014 | Matsuoka et al. | |
| 2014/0215446 A1 | 7/2014 | Araya et al. | |
| 2014/0277757 A1 | 9/2014 | Wang et al. | |
| 2014/0358291 A1 | 12/2014 | Wells | |
| 2014/0364985 A1 | 12/2014 | Tiwari et al. | |
| 2015/0081928 A1 | 3/2015 | Wintzell et al. | |
| 2015/0198938 A1 | 7/2015 | Steele et al. | |
| 2015/0234381 A1 | 8/2015 | Ratilla et al. | |
| 2016/0016454 A1 | 1/2016 | Yang et al. | |
| 2016/0054712 A1* | 2/2016 | McFarland | H04L 12/2829 700/275 |
| 2016/0062753 A1 | 3/2016 | Champagne | |
| 2016/0073521 A1 | 3/2016 | Marcade et al. | |
| 2016/0086242 A1 | 3/2016 | Schafer et al. | |
| 2016/0088438 A1 | 3/2016 | O'Keeffe | |
| 2016/0092427 A1 | 3/2016 | Bittmann | |
| 2016/0132308 A1 | 5/2016 | Muldoon | |
| 2016/0195856 A1 | 7/2016 | Spero | |
| 2016/0205784 A1 | 7/2016 | Kyle et al. | |
| 2016/0209868 A1 | 7/2016 | Hartman et al. | |
| 2016/0285715 A1 | 9/2016 | Gielarowski et al. | |
| 2016/0295663 A1 | 10/2016 | Hyde et al. | |
| 2017/0075323 A1 | 3/2017 | Shrivastava et al. | |
| 2017/0097259 A1 | 4/2017 | Brown et al. | |
| 2017/0131611 A1 | 5/2017 | Brown et al. | |
| 2017/0149638 A1 | 5/2017 | Gielarowski et al. | |
| 2017/0169075 A1 | 6/2017 | Jiang et al. | |
| 2017/0176034 A1 | 6/2017 | Hussain et al. | |
| 2017/0230930 A1* | 8/2017 | Frey | H04W 64/003 |
| 2017/0322579 A1 | 11/2017 | Goparaju et al. | |
| 2017/0365908 A1 | 12/2017 | Hughes et al. | |
| 2018/0005195 A1 | 1/2018 | Jacobson | |
| 2018/0046173 A1* | 2/2018 | Ahmed | F24F 11/30 |
| 2018/0075168 A1 | 3/2018 | Tiwari et al. | |
| 2018/0089172 A1 | 3/2018 | Needham | |
| 2018/0123272 A1 | 5/2018 | Mundt et al. | |
| 2018/0202678 A1 | 7/2018 | Ahuja et al. | |
| 2018/0266716 A1 | 9/2018 | Bender et al. | |
| 2018/0307781 A1 | 10/2018 | Byers et al. | |
| 2018/0356969 A1* | 12/2018 | Narain | G06T 11/206 |
| 2019/0017719 A1* | 1/2019 | Sinha | F24F 11/54 |
| 2019/0025809 A1* | 1/2019 | Bhattacharya | G05B 15/02 |
| 2019/0041829 A1* | 2/2019 | Sinha | H04L 43/06 |
| 2019/0087076 A1 | 3/2019 | Dey et al. | |
| 2019/0138704 A1 | 5/2019 | Shrivastava et al. | |
| 2019/0156443 A1 | 5/2019 | Hall | |
| 2019/0173109 A1 | 6/2019 | Wang | |
| 2019/0258747 A1 | 8/2019 | Milev | |
| 2019/0294018 A1 | 9/2019 | Shrivastava et al. | |
| 2019/0377306 A1* | 12/2019 | Harvey | G05B 13/027 |
| 2020/0003444 A1 | 1/2020 | Yuan et al. | |
| 2020/0018506 A1 | 1/2020 | Ruiz et al. | |
| 2020/0050161 A1 | 2/2020 | Noboa | |
| 2020/0133257 A1 | 4/2020 | Cella et al. | |
| 2020/0142365 A1 | 5/2020 | Sharma et al. | |
| 2020/0150508 A1 | 5/2020 | Patterson et al. | |
| 2020/0167066 A1* | 5/2020 | Park | G05B 15/02 |
| 2020/0167442 A1 | 5/2020 | Roecker et al. | |
| 2020/0169574 A1* | 5/2020 | Yan | G06F 21/552 |
| 2020/0183374 A1* | 6/2020 | Fries | G06N 5/04 |
| 2020/0183717 A1 | 6/2020 | Deutsch et al. | |
| 2020/0187147 A1 | 6/2020 | Meerbeek et al. | |
| 2020/0221269 A1 | 7/2020 | Tramiel et al. | |
| 2020/0226223 A1 | 7/2020 | Reichl | |
| 2020/0228759 A1 | 7/2020 | Ryan et al. | |
| 2020/0233389 A1* | 7/2020 | Ma | H04L 9/3247 |
| 2020/0233391 A1* | 7/2020 | Ma | G05B 19/042 |
| 2020/0233680 A1* | 7/2020 | Ma | G06F 16/252 |
| 2020/0233956 A1* | 7/2020 | Wang | B60L 53/305 |
| 2020/0234220 A1* | 7/2020 | Ma | G08G 1/148 |
| 2020/0255142 A1 | 8/2020 | Whitten et al. | |
| 2020/0279482 A1 | 9/2020 | Berry et al. | |
| 2020/0285203 A1* | 9/2020 | Thakur | H04L 12/2803 |
| 2020/0285788 A1 | 9/2020 | Brebner | |
| 2020/0287786 A1 | 9/2020 | Anderson et al. | |
| 2020/0288558 A1 | 9/2020 | Anderson et al. | |
| 2020/0342526 A1 | 10/2020 | Ablanczy | |
| 2020/0348038 A1* | 11/2020 | Risbeck | F24F 11/47 |
| 2020/0348662 A1* | 11/2020 | Cella | G05B 19/41865 |
| 2020/0379730 A1 | 12/2020 | Graham et al. | |
| 2020/0387041 A1 | 12/2020 | Shrivastava et al. | |
| 2020/0387129 A1 | 12/2020 | Chandaria | |
| 2021/0011444 A1* | 1/2021 | Risbeck | F24F 11/70 |
| 2021/0048797 A1* | 2/2021 | Sinha | H04L 43/0811 |
| 2021/0055716 A1* | 2/2021 | Turner | G06F 16/289 |
| 2021/0073441 A1 | 3/2021 | Austern et al. | |
| 2021/0081504 A1 | 3/2021 | Mccormick et al. | |
| 2021/0081880 A1 | 3/2021 | Bivins et al. | |
| 2021/0096975 A1* | 4/2021 | DeLuca | G06F 11/3409 |
| 2021/0109837 A1* | 4/2021 | Rakshit | G06F 11/3476 |
| 2021/0157312 A1 | 5/2021 | Cella et al. | |
| 2021/0182660 A1 | 6/2021 | Amirguliyev et al. | |
| 2021/0193334 A1* | 6/2021 | Turrin | G16Y 40/35 |
| 2021/0366793 A1 | 11/2021 | Hung et al. | |
| 2021/0383041 A1 | 12/2021 | Harvey et al. | |
| 2021/0397770 A1* | 12/2021 | Bompard | G06N 5/01 |
| 2021/0400787 A1 | 12/2021 | Abbo et al. | |
| 2022/0058497 A1* | 2/2022 | Vazquez-Canteli | G05B 15/02 |
| 2022/0066754 A1* | 3/2022 | Harvey | G05B 23/0216 |
| 2022/0070293 A1 | 3/2022 | Harvey et al. | |

OTHER PUBLICATIONS

Hernandez, et al., "A Domain-Specific Language for Real-time Dynamical Systems Emulation on a Microcontroller." Studies in Informatics and Control 28.4 (2019): pp. 453-462. (Year: 2019).

Ngyuyen et al., "IoTSan: Fortifying the Safety of IoT Systems." Proceedings of the 14th International Conference on Emerging Networking Experiments and Technologies. 2018, pp. 191-203. (Year: 2018).

(56) References Cited

OTHER PUBLICATIONS

Svenonius, Elaine, "Compatibility of retrieval languages. Introduction to a Forum." KO Knowledge Organization 10.1 (1982): pp. 2-4. (Year: 1983).

BigLadder Software Full Ref, Occupant Thermal Comfort: Engineering Reference, 2014, The Board of Trustees of the University of Illinois and the Regents of the University of California through the Ernest Orlando Lawrence Berkeley National Laboratory (Year: 2014).

Hagentoft et al. Full Reference, Assessment Method of Numerical Prediction Models for Combined Heat, Air and Moisture Transfer in Building Components: Benchmarks for One-dimensional Cases, Journal of Thermal Env. & Bldg. Sci., vol. 27, No. 4, Apr. 2004.

U.S. Appl. No. 15/995,019 Office Action mailed Jul. 26, 2019.

U.S. Appl. No. 15/995,019 Office Action mailed Oct. 8, 2020.

U.S. Appl. No. 15/995,019 Office Action mailed Apr. 15, 2020.

Amin, Massoud, "Toward self-healing energy infrastructure systems," IEEE Computer Applications in Power 14.1 (2002): pp. 20-28.

Gou, Wenqi, and Mengchu Zhou, "An emerging technology for improved building automation control," 2009, IEEE International Conference on Systems, Man and Cybernetics, IEEE, 2009, pp. 337-342.

Gungor et al., "Industrial Wireless Sensor Networks: Challenges, Design Principles, and Technical Approaches," IEEE Transactions on Industrial Electronics, vol. 56, No. 10, Oct. 2009.

Gou, Wendy et al., "Wireless mesh networks in intelligent building automation control: a survey." International Journal of Intelligent Control and Systems, vol. 16, No. 1, Mar. 2011, 28-36.

Kastner, Wolfgang, et al., "Building Automation System Integration into the Internet of Things, The IoT6 Approach, Its Realization and Validation," Proceedings of the 2014 IEEE Emerging Technology and Factory Automation (ETFA), IEEE, 2014, pp. 1-9 (Year:2014).

Shailendra, Eshan et al., "Analyzing home automation and networking technologies," IEEE Potentials 37.1 (2018): pp. 27-33, (Year: 2018).

De Meester et al., SERIF:A Semantic Exercise Interchange FormatConference: Proceedings of the 1st International Workshop on LINKed EDucation, Oct. 2015.

Yegulap, Serdar, "What is LLVM? The power behind Swift, Rust, Clang, and more," Infoworld, Mar. 11, 2020.

Kalagnanam et al., "A System For Automated Mapping of Bill-of_Materials Part Numbers", KDD '04: Proceedings of the tenth ACM SIGKDD international conference on Knowledge discovery and data mining, Aug. 2004, pp. 805-810.

Mouser Electronics News Release, Aug. 16, 2018.

Ouf et al., Effectiveness of using WiFi technologies to detect and predict building occupancy, Sust. Buildi. 2, 7 (2017).

Radiomaze, Inc., "WiFi signals enable motion recognition throughout the entire home," Dec. 4, 2017.

Sensorswarm, 2018.

Serale G., et al., Model Predictive Control (MPC) for Enhancing Building and HVAC System Energy Efficiency: Problem Formulation, Applications and Opportunities, Energies 2018, 11, 631; doi:10.3390, Mar. 12, 2018.

Siano, P, "Demand response and smart grids—A survey", Renewable and Sustainable Energy Reviews 30 (2014) 461-478.

Wang et al., "A Practical Multi-Sensor Cooling Demand Estimation Approach Based on Visual Indoor and Outdoor Information Sensing," Sensors 2018, 18, 3591; doi:10.3390.

Brour, Mourad, and Abderrahim Benabbou. "ATLAS Lang MTS 1: Arabic text language into Arabic sign language machine translation system." Procedia computer science 148 (2019): pp. 236-245. (Year: 2019).

Shaalan, Khaled. "Rule-based approach in Arabic natural language processing." The International Journal on Information and Communication Technologies (IJ ICT) 3.3 (2010): pp. 11-19. (Year: 2010).

\* cited by examiner

SEMANTIC LABELING ANALYSIS

RELATED APPLICATION

The present application hereby incorporates by reference the entirety of, and claims priority to, U.S. Provisional Patent Application Ser. No. 63/070,460 filed 26 Aug. 2020.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure relates to translating computer language into languages that people can understand. More specifically, a controller contains a thermodynamic model of a digital space, which it can convert to a human-readable model comprising resources, spaces, sensors, etc.

BACKGROUND

Building systems are the world's most complicated systems. Even the smallest buildings easily have thousands of I/O points—or degrees of freedom. In large buildings the I/O points can exceed hundreds of thousands, and with the growth of the IoT industry, the complexity is only growing. Only once we give buildings their due respect against comparative cyberphysical systems like autonomous vehicles, Mars rovers, or industrial robotics, can we start the conversation on what we do to address the complexity.

In addition to managing this rising system complexity and evolving customer demand, there is exponential growth in the diversity of applications and use cases. We are exhausting our tools with workarounds to solve this exploding complexity. We are asked to model not only the HVAC systems, but the architectural and engineering workflow. We need more than tags, more that labels, more than interconnections. We need not only to describe hydronic and air flows between mechanical equipment, but the data flow within and between IT and IoT systems. We need to connect not only the building systems to the structural elements, but also the interconnected business systems within—whether that is the processes of occupants, logistics, manufacturing, energy, or any of the myriad services we are currently being asked to integrate with the building.

In spite of all the complexity, almost all building controls today are model-free. The model-free approach, while simple to implement, becomes quite difficult to manage and optimize as the complexity of the system increases. It also lacks the inherent self-knowledge to provide new approaches to programming, such as model-driven graphical programming, or to govern the interconnections between components and sub-system synergistics. Digital model based approaches to date have been limited in scope and specific to known models defined a-priori. They have thus lacked the ability to enable users to create complex systems of interconnected building zones by ad hoc means, use simple graphical user interfaces to define a system, or enable a thermodynamic digital system model to evolve its control optimization and commissioning over time in situ. However, even when one has developed a thermodynamic digital system model, it can be very difficult to translate the computer version into a version that can be understood by a human. If the simulation is just a black box of equations, then it is very difficult, if not impossible, to understand how computer actions map to human understandable actions.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

In general, some technologies described herein described methods and systems for semantic labeling analytics.

In embodiments, a system for determining and reporting building management system analytics is disclosed, the system comprising: a physical space with a controller, display screen, and devices, the controller comprising computer hardware and memory, the controller operationally able to control the devices, the computer operationally able to track the devices; a computer program in the memory configured to display, on the display screen, at least one of: state of the devices over a given time, an event associated with at least one of the devices, length of time of the event, an action associated with the event, or detail associated with the event, and wherein the controller operationally able to track the devices comprises at least one of: tracking reason for device state change, tracking state change times, tracking state change reasons, tracking device errors, tracking device error times, tracking device error resolutions, and tracking device error resolution times.

In embodiments, a digital model of the physical space comprises digital models of the devices, wherein the digital model of the physical space is operationally able to simulate devices in the digital model of the physical space from a first time to a second time, and wherein the display screen is operationally able to display simulated physical space behavior from a first time to a second time.

In embodiments, the event associated with at least one of the devices comprises: a state change associated with at least one of the devices and a state change action that is the reason for the state change.

In embodiments, the event is a priority interrupt, and wherein detail associated with the event is reason for the priority interrupt.

In embodiments, the controller is configured to display at least one device error resolution and time of the at least one device error resolution.

In embodiments, the physical space is divided into zones, and the controller is configured to display state per zone over a given time.

In embodiments, the controller is configured to display desired state and achieved state within the physical space.

In embodiments, the controller is operationally able to change a device state upon accepting user state change request.

In embodiments, other system information is control information related to device state.

In embodiments, the controller configured to display state of devices over a given time further comprises being operationally able to scroll the display screen to display a further section of time.

In embodiments, the controller configured to display state of devices over a given time further comprises the controller being operationally able to zoom the display screen to display a smaller section of the given time in greater detail.

In embodiments, the controller is wired to at least some of the devices.

In embodiments, the controller is within the physical space.

In embodiments, the digital model of the physical space uses machine learning methods utilizing historical data of the devices to simulate the devices in the digital model of the physical space from a current time to a future time.

In embodiments, a method of reporting building management system analytics is disclosed, comprising: accepting a plurality of devices in a controlled space with a plurality of associated device languages and a plurality of associated device characteristics; accepting a plurality of devices in a controlled space with a plurality of associated device languages and a plurality of associated device characteristics; translating the plurality of associated device languages to a common internal language; in the common internal language, creating a plurality of actors using the plurality of associated device characteristics; in the common internal language, labelling the plurality of actors with recognizable names; creating a program that runs the plurality of devices in the controlled space using the plurality of actors, physics equations associated with the plurality of actors, and a plurality of quanta associated with the plurality of actors; when the plurality of devices in the controlled space are running, accepting information from the plurality of devices, then translating the information from the plurality of devices into the common internal language; translating the information from the plurality of devices in the common internal language to a human-readable language; using the human-readable language to create reports; and displaying the reports on a display screen associated with the controlled space.

In embodiments, in the common internal language, physics equations are generated associated with the plurality of actors based on the the plurality of associated device characteristics; in the common internal language, a plurality of quanta are derived from the plurality of actors and at least one transport; a simulation that models the controlled space using the plurality of actors is created, the physics equations associated with the plurality of actors, and the plurality of quanta; and the program is run into a future time producing future simulation results.

In embodiments, a digital model of the controlled space is included, and wherein the simulation uses machine learning methods utilizing historical data of the plurality of devices to simulate the plurality of devices in the digital model of the controlled space from a current time to a future time.

In embodiments, a non-transitory computer readable storage medium is included, the non-transitory computer readable storage medium configured with data and instructions that upon execution by at least one processor in a controller computing system having a device attached thereto, a device interface, and predefined device models in programmable memory, the predefined device models storing instructions for creating a digital twin model of space associated with the device models, when the instructions, when executed by a processor, cause the processor to perform steps including: when a device changes state, using the digital twin model of the space to determine a reason for the device state change, and to track a time that the device state change occurred; when the device records an error, using the digital twin model of the space to determine a reason for the device error, and to track a time that the error occurred; when the device error is resolved, using the digital twin model of the space to determine details of the resolution, and tracking a resolution time of the device error; and displaying, on a display screen, at least one of: the device state change, the reason for the device state change, the reason for the device error, the time that the error occurred, the resolution reason for the device error, and the resolution time of the device error.

In embodiments, a computer-enabled method of determining and reporting analytics of a space controlled by a controller is disclosed, the computer-enabled medium using a controller with hardware and memory, the controller wired to a device, a digital twin model of the device stored in memory, the digital twin model of the device integrated into a digital twin model of the space, comprising: when the device changes state, using the digital twin model of the space to determine a reason for the device state change, and to track a time that the device state change occurred; when the device records an error, using the digital twin model of the space to determine a reason for the device error, and to track a time that the error occurred; when the device error is resolved, using the digital twin model of the space to determine details of the resolution, and tracking a resolution time of the device error; and displaying, on a display screen, at least one of: the device state change, the reason for the device state change, the reason for the device error, the time that the error occurred, the resolution reason for the device error, and the resolution time of the device error.

In embodiments, the digital twin model runs concurrently with the physical space operation.

In embodiments, the digital twin model uses machine learning methods utilizing historical data of the device to simulate the device in the digital model of the controlled space from a current time to a future time.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

Figure 1:
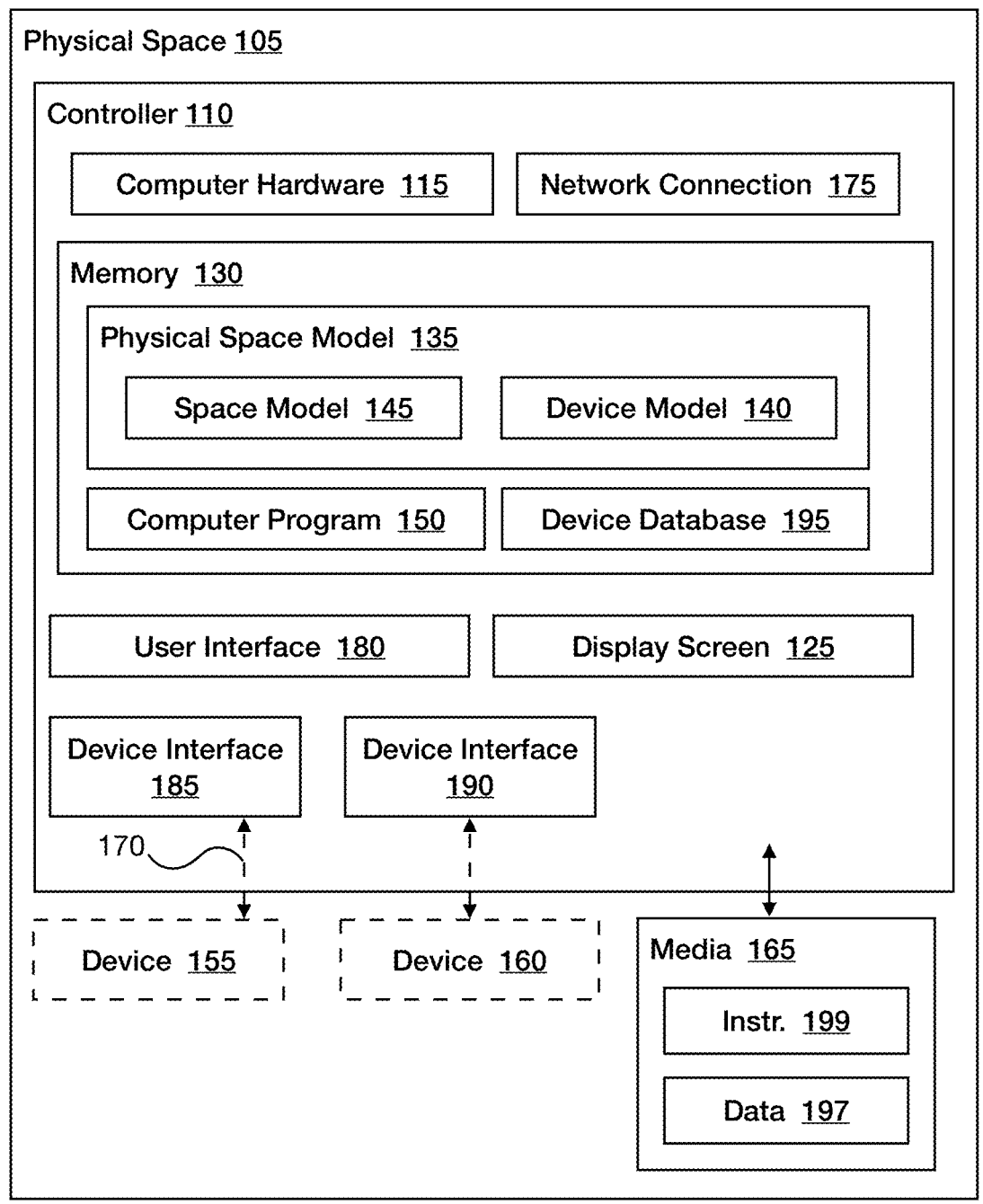
FIG. 1 depicts a functional block diagram showing an exemplary embodiment of a semantic labeling analysis system in conjunction with which described embodiments can be implemented.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to point mapping interfaces. In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments. "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

In addition, it is appreciated that the figures provided herewith are for explanation purposes to persons ordinarily skilled in the art and that the drawings are not necessarily drawn to scale. Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). "Program" is used broadly herein, to include applications, kernels, drivers, interrupt handlers, firmware, state machines, libraries, and other code written by programmers (who are also referred to as developers) and/or automatically generated. "Optimize" means to improve, not necessarily to perfect. For example, it may be possible to make further improvements in a program or an algorithm which has been optimized.

"Method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense). "Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

The technical character of embodiments described herein will be apparent to one of ordinary skill in the art, and will also be apparent in several ways to a wide range of attentive readers. Some embodiments address technical activities that are rooted in computing technology, such as providing an interface to be able to translate the language of diverse pieces of equipment into a common language. This common language can be used to easily translate what devices are doing into human language, making assembling reports, viewing existing behavior, and, by translating back into specific device language, directing machine usage using a human-language interface. This allows reports to be created that disclose specifics about system behavior that can be used to more easily discover and fix errors that occur, fine-tune a system that allows for energy savings, for easier maintenance, etc.

I. Overview

With systems and methods described herein, basic portions of a building control system can be labeled such that the detailed working of systems in the building, such as HVAC systems, lighting systems, security systems, etc., can be monitored and analyzed in real time, with the monitoring able to also monitor individual components of the systems, and monitor how the individual components interact. As the building control system understood how the different portions relate to each other, accurate easy-to-understand details about the system are automatically produced. Users can answer questions such as "what happened in the past," "how it happened," "why it happened," and "what will be happening in the future." A simulation runs using a complex set of equations, but these equations need to be translated into a form that humans can understand.

In some embodiments, the series of events that make up the simulation is unwound into human terms. The underlying framework of existing and currently proposed building standards are largely semantic standards. They ask the question "what is my name?" In contrast, a true ontology that understands a building system at a deep level asks "who am I?" One is a linguistic question, the other an existential one. What is the difference? Simply put, if I know you have a "pump" in English, I can label it. If we both agree that pumps are labeled "pump" and have a format, I can tag it. If we agree on an interconnect scheme I can define a system topology. Yet for all this effort, a system still doesn't know what a "pump" actually is or what it does. And without this you can't autonomously control it, optimize it, or learn on it.

However, by defining object existentials using their underlying physics (e.g., what a chair does in physics terms which is stop an object from falling, in equation form: e.g., $R_{Force}$=Gravity×$Mass_{rear}$), meaningful purpose in context can be imputed to specific object application and control. We here present the concept of actors. Actors are the role a piece of equipment takes in any system. A describable system has defined actors. For example, a buffer tank is a store (in this case, heat). So is a battery (electricity), a sand bed (heat), and a flash drive (data). A transport on the other hand, moves substance from one place to another. Pumps move water, fans move air, and conveyers move boxes—yet they all perform the same transport role within their respective systems.

If a system understands what actors are, it can discern the purpose of any equipment, and how to orchestrate a system. The counterpart to the actors are quanta. Quanta are the packets of substance exchanged between actors. Tools and techniques herein balance the needs of complexity with the requirements of implementation simplicity and democratizing automation to a broad set of users. As a brief overview a few of the terms and questions are discussed in greater detail. "How am I connected?" Objects in the models know what other objects are connected to them, and what such connections entail and how they are connected. The zones in a building model know what zones are around them, and how those zones thermodynamically interact with them. The equipment in an equipment model knows what equipment and other inputs are attached to them, and how they are thermodynamically connected. "Where am I located?" A building literally knows where it is physically in the world (longitude and latitude), and the building area (individual systems, subsystems and zones) know where they are in relation to the other systems, subsystems, and zones. Similarly, equipment knows where it is in a building. "What can I do?" Equipment understands its inputs and outputs. "How do I introspect?" A building area and the equipment in a model knows how the information there is to know about itself, and has methods to find and report on that knowledge. This allows analytics even where there are no sensors. "How do I function?" A piece of equipment understands how it works thermodynamically, and in many other ways. For example, a piece of equipment (or its representation in a computer program) may understand specifics about itself, such as, for a given piece of equipment, any errors it throws, transfer functions, pressure, energy needs, how efficiently it is running, i/o functions it may possess, and so on. "How do I talk?" The system has protocol semantic mapping such that it understands different languages that different devices understand to communicate, e.g., Modbus, Bacnet, KNX, I/O, Lon, MS/TP, which it translates into a common language.

II. Exemplary Semantic Labeling Systems

With reference to FIG. 1, a system is shown that may be used, in whole, or in part, in any of the embodiments disclosed herein. FIG. 1 describes an example building management system incorporating innovative technology described herein to support semantic labeling analytics. A controller 110 is disclosed, which may be part of a physical space 105. The controller 110 may control aspects of the physical space 105. The space may be a building, a portion of a building, a zone within a building, a room in a building, a floor of a building, a collection of buildings, a collection of buildings and the grounds around them, a portion of a number of buildings, and so forth. The controller may comprise a single controller housed in a single controller box, may be multiple controllers that work together, such as, for example, using distributed systems methods, and so on. These controllers may be capable of mastering the system for the physical space being modeled. At startup, the controllers may vote to elect a leader. If the internal network is damaged, a new leader may be elected, providing I.T. and built-in redundancy. Some controllers may be satellite controllers that comprise a limited set of functions of a controller 110, such as fewer device interfaces.

The physical space 105 has a plurality of devices 155, 160 that are controlled by a controller 110. The devices may be, without limitation, resources used in HVAC systems, lighting systems, entertainment systems, security systems, irrigation systems, etc. These devices may be connected to the controller by being wired 170 directly to a device interface 185, 190 associated with the controller, or through a network connection 175. Some devices might have both a network and a wired connection.

Though only one controller 110 is shown, multiple controllers are also envisioned, which may be connected using one or more networks 175 such as wireless technology, wired technology, such as Ethernet, or combinations of the two. Multiple controllers may run using distributed computing techniques. They may also run using client-server networked technology, by clustering, by using distributed self-healing net technology, etc. The controller 110 includes computer hardware 115 which itself includes at least one processor. The controller also includes one or more computer-readable storage media 165 such as CD's; CD-ROMs, optical disks, such as DVD-ROMs; magnetic disks, such as certain types of hard drives; memory sticks, and so on. An I/O device that further comprises a display screen 125 is also included. Other types of I/O connections such as bluetooth adapters, printers, dongles, modems, keyboards, computer mice, joysticks, trackballs, scanners, graphic tablets, microphones, speakers, etc., may also be included. Memory 130 includes computer programs 150 wherein semantic labeling analytics may be implemented in whole or in part. This memory 130 can be any appropriate volatile or non-volatile storage subsystem.

The memory 130 also includes a physical space model 135. The physical space model 135 comprises a digital model (e.g., a space model 145 and/or a device model 140) of the physical space 105. The space model 145, in some embodiments, comprises a neural network that represent the individual material layers of the building, and physics equations that describe the way these layers behave in the world. These may be modeled by a neural network where the neurons are arranged spatially similarly to the material layers of the building. State information flows through the model following physical rules. An example of such a network that might be used herein is disclosed in, and hereby incorporates by reference the entirety of U.S. patent application Ser. No. 17/009,713, filed Sep. 1, 2020. In some embodiments, the space model comprises a different sort of machine learning algorithm, and/or a different sort of neural network.

The device model 140, in some embodiments, comprises a neural network that represents equipment, their connections, and outside influences on the equipment, such as weather. The neurons in the neural network have physics equations that describe equipment state change, and may be arranged spatially similarly to the locations of the modeled equipment in a physical space. Equipment neurons may also have state input(s) and state output(s), state parameters with values, allowable state parameter values, state input location data, and state output location data. The location data can be cross-referenced to the thermodynamic building model locations. These nodes inputs and outputs along with the connections between the equipment form a heterogeneous neural network. State information flows through the model following physical rules. An example of such a neural network that might be used herein is disclosed in, and hereby incorporates by reference, is the entirety of U.S. patent application Ser. No. 17/143,796, filed Jan. 7, 2021.

The physical space model may operationally be able to simulate devices (using the space model 145 and/or the device model) in the digital model of the physical space from a first time to a second time. The first time may be any time from the past to the future, and the second time may be any time that is after the first time. A display screen 125, in connection with a user interface 180 is operationally able to display simulated physical space behavior, eg., from the first time to the second time. The first time may be any time from the past to the future, and the second time may be any time that is after the first time. In an illustrative embodiment, the first time is the current time, and the second time is a future time. In another illustrative embodiment, the first time is a time 7 days ago, and the second time is a time 5 days ago.

In an embodiment, the design of the graphics utilizes the strengths of visualization to understand how variables within a system work together, effect one another, or might behave in the future. These provide, among other benefits, ease of use in viewing history, a view of expected system behavior, and an explanation for why the system is behaving as it is.

Media 165 may include non-transitory computer-readable media. Computer-readable media are any available non-transient tangible media that can be accessed within a computing environment. Non-transitory computer-readable media does not include signals. By way of example, and not limitation, with the controller computing environment, computer-readable media include memory 130, storage (not shown), communication media, and combinations of any of the above. Computer readable storage media which may be used to store computer readable media comprises instructions 199 and data 197. Data Sources for the data may be computing devices, such as general hardware platform servers configured to receive and transmit information over the communications connections, such as network connections 175. The computing environment may be an electrical controller 110 that is directly connected to various resources, such as HVAC resources, and which has CPU, a GPU, Memory 130, input devices such as a display screen 125, and/or other features typically present in a computing environment. The computing environment may be a series of distributed computers. These distributed computers may comprise a series of connected electrical controllers.

II. Exemplary Semantic Labeling Analytics Methods

Figure 2:
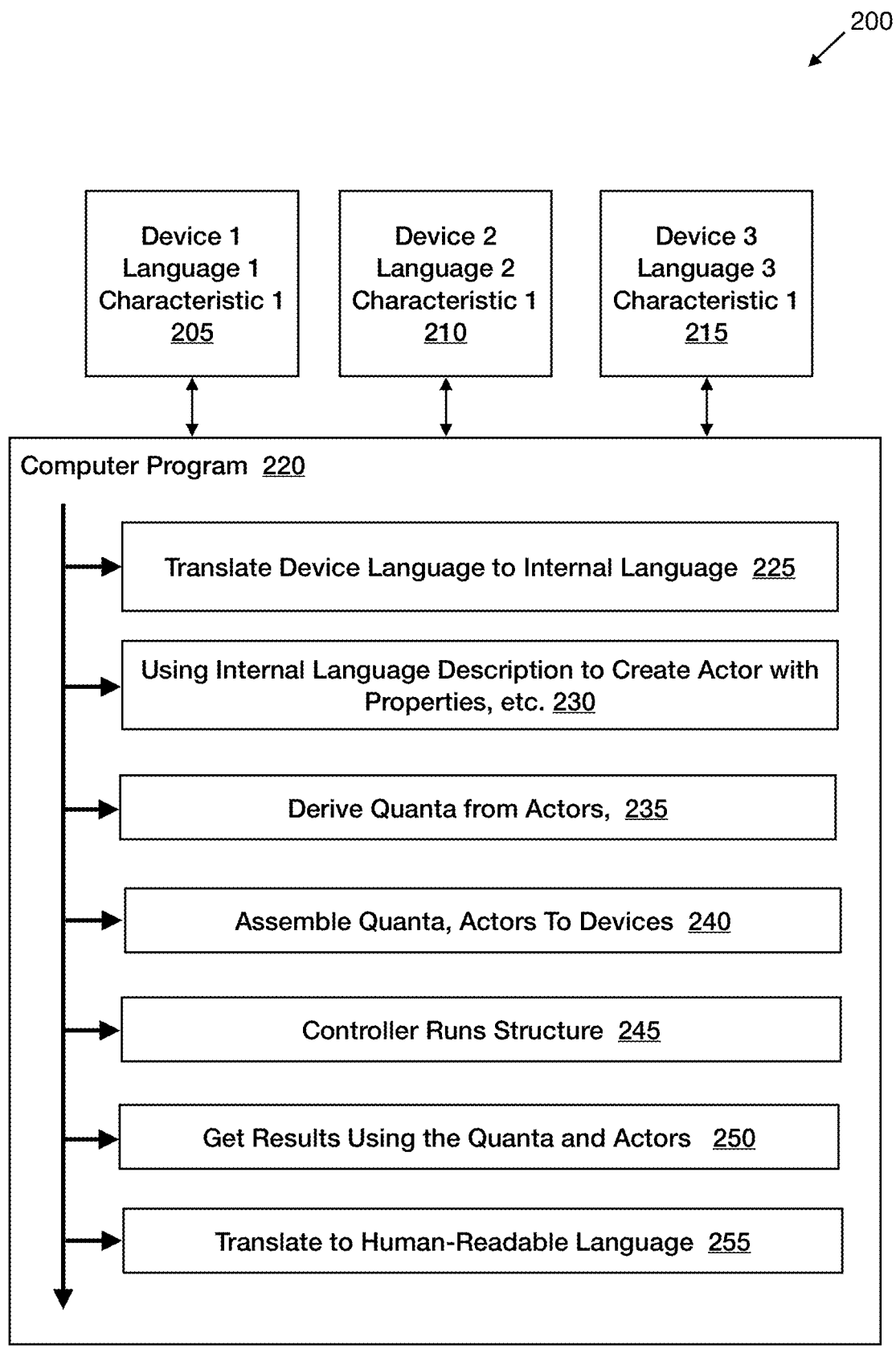
FIG. 2 depicts a flowchart showing an exemplary embodiment of a semantic labeling device language to human language system in conjunction with which described embodiments can be implemented.

FIG. 2 illustrates an example building management method 200 incorporating innovative technology described herein to allow the digital model of the physical space to semantic label analysis. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting. In some embodiments, method 200 may be implemented in one or more processing devices (e.g., a digital processor, an analog processor, a digital circuit designed to process information, an analog circuit designed to process information, a state machine, and/or other mechanisms for electronically processing information).

The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200. In a given embodiment zero or more illustrated steps of a method may be repeated, perhaps with different values, sensors, controllers, or devices to operate on. Steps in an embodiment may also be done in a different order than the order that is laid out in FIG. 2. Steps may be performed in a partially overlapping manner, or fully in parallel, serially. The order in which method 200 is traversed to indicate the steps performed may vary from one performance of the method to another performance of the method. The flowchart traversal order may also vary from one method embodiment to method embodiment. Steps may also be omitted, combined, renamed, regrouped, or otherwise depart from the illustrated flows, provided that the method performed is operable and conforms to at least one claim.

In the disclosed embodiment, a plurality of device data streams are accepted into a plurality of device interfaces in a controller. The device streams 170 are accepted into the device interfaces 155, 160 and are then passed to the device database which can then look up more information about the devices 155, 160. Different data streams may have different device languages and different device characteristics. Information about the device languages and device characteristics may be stored in the device database, may be stored in the computer program 150, and/or a combination of the database 195 and the computer program 150 may be used, or such information may be stored elsewhere.

In an embodiment, device 1 205, attached to a controller, such as controller 110, speaks language 1, and has characteristic 1; Device 2 210, speaks language 2 and has characteristic 2; Device 3 215, speaks language 3 and has characteristic 3. Some devices have multiple characteristics.

At operation 225, a computer program 220, such as the computer program 150, is operationally able to translate the plurality of assorted device languages into a common internal language. This may allow a controlled space (such as a building), and systems within a controlled space (security, HVAC, entertainment, etc.), to share the common internal language. The computer program 150, 220 may also translate information about the device, such as the device's location, the device's physical characteristics (including physics equations that define the physical actions produced by the device), and parameters that tune the device behavior, etc. The controller may have a device database 195 that includes detailed information about specific devices, such that the common internal language translation process (or another portion of the described embodiments) can determine information about a device that the device does not pass on itself to the computer program 220. This information may comprise the physics equations that describe the device, parameters that describe specifics about the device, etc.

These device languages may be a device language, or computer language that might interface with the controller 110 through a device interface 185, 190, etc. Some of these device languages include BACnet, KNX, MS/TP, Bluetooth, Bluetooth (BLE) mesh, Zigbee, Z-Wave, LoRaWan, Thread, X10, Insteon, MQTT, CoAP, AMQP, DDS, HTTPm WebSocket, Modbus, Analog I/O systems, WIFI standards, etc. The device languages feed into a computer program 220. In the program, the device language is translated, if necessary into a common internal language, which may be a generalized AI definition language for real-time automation and analysis. This may create a unified building description model for interchange and smart grid systems, and/or may allow an existing IoT network with one language to be added to a complete model with another. None of this is doable using any of today's semantic standards.

At operation 230, a plurality of actors is created using the plurality of associated device characteristics. Other things may be accessed to create the plurality of actors using the associated device characteristics, such as: a device database, information received from the data streams 170, a different database, a combination of these information methods, or another set of operations. Actors move materials (quanta) through space—the program translates the internal language description of the device into an actor with physics, and labels. The actors are described at least in part by physics equations and variables. An example of such an equation set is shown with reference to FIG. 3 and the surrounding text. The computer program may also be able to label each of the devices in the common internal language with a label—a recognizable name.

At operation 235, the program derives the quanta from the actor determined at 230. In some implementations, the label will also be used to derive the quanta. For example, a water pump will move (thus, derive) water, a conveyor belt will move (thus, derive) boxes, a heater will move air, and so on. The quanta does not just move on its own; rather, a type of actor known as a transport moves the quanta between other actors.

Ay operation 240, the actors and the quanta are associated with the device and any associated devices. This way, as the devices are run, the controller can understand what is happening to the devices at an ontological level. That is, the controller understands what the device is, what substances it works with, and so can report with great specificity about what happens. For example, if an unexpected action occurs, the controller (and/or a computer program working with the controller) can determine—from the state of the space being controlled by the controller—what the action is, what resources caused it., and a possible reason for the action. For example, with reference to FIG. 8A, behavior of storage systems 880 is shown for a given time 850. The storage drawer has been opened displaying the equipment that make up the storage system—a Buffer Tank, Domestic Hot Water Tank, and a Ground Heat Source 891. Events 885, broken down into actions and reasons 885 can also be seen. These events include actions, such as priority interrupts, 887 and the reason for the action, such as a system stop 889. The time of an event can also be shown, as well as actions of the storage systems, and times of the actions 893. In the instant embodiment, the times a system are on are marked as a colored rectangle.

At operation 245, the quanta, and actors are integrated into a program that runs the system that, e.g., the controller controls.; i.e., a building, etc. At operation 250, the controller runs the structure, turning machines on and off, etc. This running of the structure comprises the devices running, changing state of the quanta as necessary and moving the quanta through a model of the physical space. This models the state (e.g., temperature, sound value, $CO_2$ values, humidity etc.,) of the controlled space over time as the devices are run. This model may also comprise desired values (such as temperature), more complex desired values, such as comfort levels, etc. At 255, the model results are translated from the internal simulation language into human-understandable language. This human-understandable language (such as English) can then be used to create reports, such as those shown in FIGS. 6 through 10.

Figure 3A:
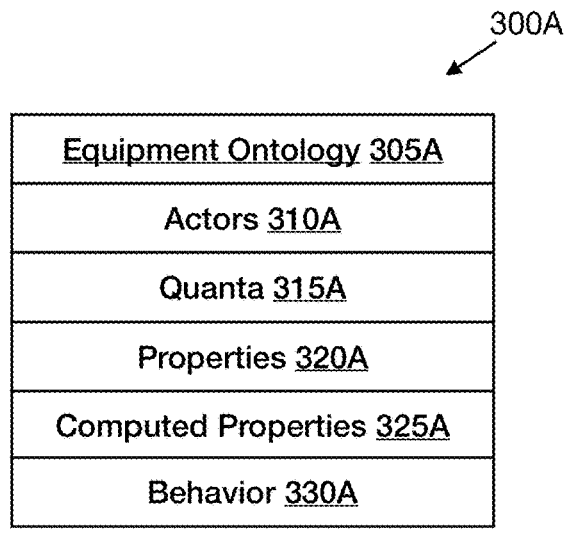
FIG. 3A depicts objects in an actor ontology in conjunction with which described embodiments can be implemented.

FIG. 3A illustrates some more information 300A about an equipment ontology 305A. An equipment ontology 305A is concerned with "What it is", whereas semantic tagging is "How to say it" in a protocol or disk format. For example a "chair" is merely tagged as "chair" in English, but carries no inherent meaning. One can fundamentally define a chair not as the five letters "chair", but a gravity resistor that keeps you from hitting the ground when you sit down. You can translate the fundamental nature of a "gravity resistor" into many languages and protocols, but its existential purpose never changes. It doesn't matter if its semantic label is "chair", "throne", "couch", or "bench"—they all play the same role. More compellingly, by defining object existentials using their underlying physics (e.g., $R_{Force}$=Gravity× $Mass_{rear}$) meaningful purpose for equipment may be computed in context to its application or control. After all, physics is a universal standard for defining "What", "How", and "Why". Using described embodiments one can define how sets of resources in configurations can be operated and be controlled. But perhaps more importantly, the embodiments may answer the key question for resources (or their proxy): "who am I?" If a resource can answer this existential "machine-to-sell" question, it can also answer the simpler ones of machine-to-machine and machine-to-human. Those other interactions become essentially, semantic downcasting. Downcasting is a common programming method of casting a reference of a base class to one of its derived (sub- or leaf-) classes.

More specifically, in embodiments, the resources are defined as known actors. These actors have inherent knowledge of who they are. This may take the form of physics equations that define the actor behavior, and properties that define the variables that describe specific behavior for an actor. An actor 310A is, among other things, a definition of the role a resource takes in a system. A buffer tank, for example, stores heated water, which is used as a source for heat (a state), and so has a role as an actor store. So is a battery, a sand bed, and a flash drive—all stores of different states: energy, heat, and information. The different roles actors can take will be discussed more fully with reference to FIG. 300B. The counterpart to the actors are quanta 315A. Quanta 315A are packets of substance exchanged between Actors. Quanta can represent continuous flows, or discrete packages, but they are quantized so they can be operated on in a consistent manner. Quanta can be mechanical, with the quanta itself e.g., an amount of rotation, etc; fluid, with the quanta itself e.g., an amount of liquid, etc., control, with the the quanta itself being, e.g., a control vector, etc.; electric, with the quanta itself being an amount of electricity, etc; and so on. An Actor 310A, or Quanta 315A may have Properties 320A associated with them. Properties 320A may be variables that describe features of the Actor 310A or Quanta 315A. These features may be specific behavior features of the actors 310A or quanta that determine how the object (actor or quanta), behaves. This is described in greater detail with reference to FIG. 4, and the surrounding text. Properties 320A may have one or more computed properties 325A associated with them. The computed properties are equations that describe the behavior of the actor-quanta interface—quanta interact with the actor, and exit changed, or one type of quanta enter and another type exit, etc. This is also described in greater detail with reference to FIG. 4. Behaviors 330A are the emergent properties that arise when the Actors 310A and Quanta 315A with their properties 320A and computed properties 325A interact.

Figure 3C:
FIG. 3C depicts actors in an equipment ontology in conjunction with which described embodiments can be implemented.
Figure 3B:
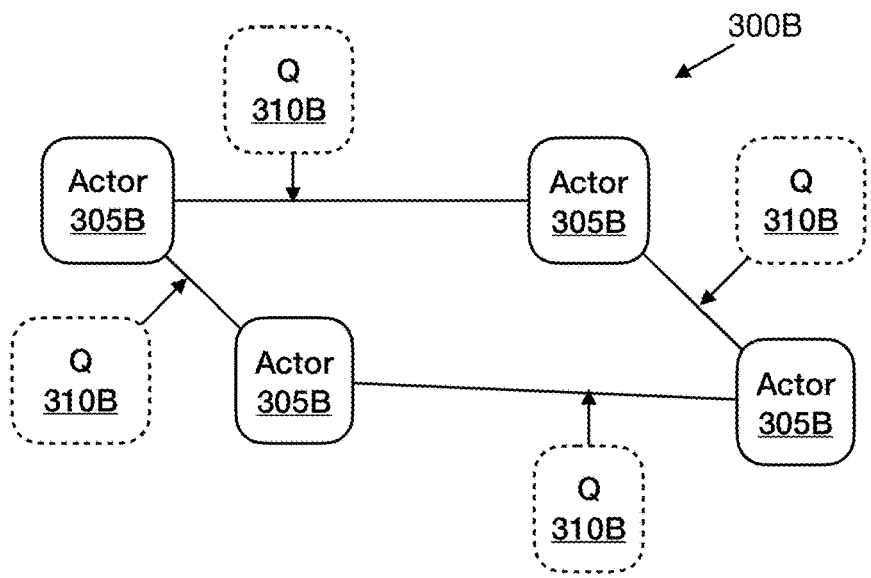
FIG. 3B depicts connected objects in an equipment ontology in conjunction with which described embodiments can be implemented.

FIG. 3B discloses a way that actors and quanta may be connected 300B. In some embodiments, as shown with reference to FIG. 3B, actors 305B are connected by quanta 310B, creating an interconnection net 300B. By looking at the interconnection net 300B, the connections can be determined between the different actors and which quanta travel through them. When an error occurs in one actor, by tracing through the interconnection net and looking at values in the actors, e.g., as shown with reference to 400, when an error is caused by a device upstream (or downstream) from the device that recorded the error, the actual error location and error reason may be able to be determined. For example, when a boiler shuts off, rather than just reporting that the boiler has shut off, information of interest around the shutoff may also be determined. For example, the boiler may be connected to a water outlet. Once the system understand the connection, the water outlet can then be interrogated. The interrogation may show that the water outlet may have recorded a water temperature of 200 degrees, which would automatically cut off the water. From this, the system may be able to determine that boiler may have shut off because no water was coming into it. This error message may be recorded., along with the reason for the error (the water outlet shut down because the water going through it was too hot), the time the error occurred, and so on. The reason why the water was so hot may be able to be determined by following the interconnection net to the next actor upstream, and so on. We should be able to determine a whole story about what happened. When an event happens in the digital twin that is to be recorded, the digital twin receives a signal that an error has occurred, e.g., the boiler shut off. One may look inside the digital twin representation of the boiler, determine its actor and quanta, describe the values of the quanta (no water, e.g., a fluid quanta), walk the network connection graph to determine where the quanta comes from (e.g., discover the intake valve), determine values of the intake valve actor (e.g., determine that the water quanta was too hot, so intake valve actor was shut off), and so on. These actions are able to be performed because the system understands what the devices do, and so can make what appears to be intelligent decisions about them. While discovering all this information, the accumulated knowledge discovered can be recorded and reported. This allows the collection of information about the system that is otherwise very difficult to acquire.

In some embodiments that use neural networks to embody these ideas, actors 305B can be thought of as equivalent to neural network nodes, while the quanta 310B are equivalent to the weights and mapping between the nodes. Using these ideas, a neural network can be built that models the physical system of interest. The actors 305B may be connected through quanta 310B.

FIG. 3C illustrates some more information 300C about possible actor types 305C. Producers 310C are producers of Quanta 315A. For example, a boiler produces heated water. Consumers 315C consume Quanta 315A. For example, the boiler will consume electrical quanta. A transformer 320C transforms one sort of quanta to another. For example, a flat plate heat exchanger transforms quanta of one sort to temperature-changed quanta of a different sort. A transport 325C moves Quanta from one Actor to another. For example, a pump moves liquid quanta, a fan moves air quanta, and a conveyer belt moves box quanta. A store 330C stores quanta. A Router 335C switches Quanta 315A from one path to another; for example, a valve, a relay, a network router and a damper. A Mixer 340C accepts two or more quanta 315A and produces a mixed quanta 315A that is a combination of the accepted quanta. A path 345C is a path though which quanta can move. Examples include a pipe, a duct, and a wire. A Branch 350C moves some quanta to a different path, such as a Tee-junction.

An actor is defined by what it does on its output quanta. For example, a motor as the actuator for a valve may have electrical input quanta and mechanical (rotation) output quanta. In the sense of input quanta, the motor is consumer of power. However, the motor actor type is defined based on the mechanical (rotation) quanta as the output quanta. In this sense, the motor is classified into the transport actor type as it transports the angle; i.e, it opens or closes a valve that diverts the quanta in a specific direction. When a motor is used to actuate a pump, it produces torque which turns a pump shaft as output. So, in this specific application, a motor is considered as a producer actor.

Figure 4:
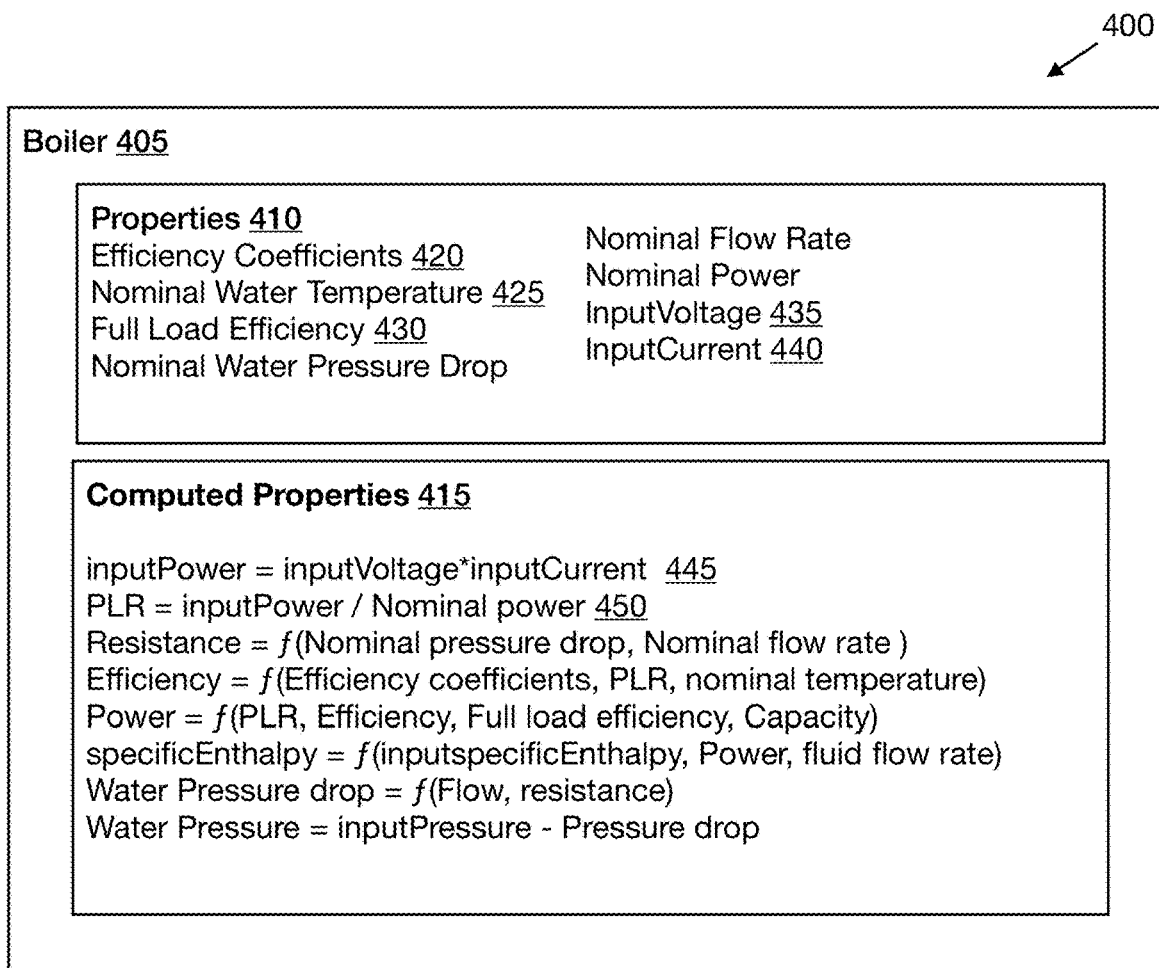
FIG. 4 depicts a block diagram which describes an exemplary physics description of an actor in conjunction with which described embodiments can be implemented.

FIG. 4 aaa 400 illustrates properties 410 and computed properties 415 that can be used to define specific actors 305. In the illustrated embodiment, a boiler 405 (an actor of type producer) is described by properties 410 and computed properties 415. The properties are variables that can be tuned to describe the specificities of a particular boiler. They include Efficiency Coefficients 420, Nominal Water Temperature 425, and Full Load Efficiency 430. These computed properties comprise physics equations (e.g., 445, 450) that interact with the properties 410. For example, the computed property inputPower 445 is determined by multiplying the property InputVoltage 435 by the property InputCurrent 440. Different boilers may have different properties (e.g., Efficiency Coefficients 420, Input Voltage 435, Full Load Efficiency 430 etc.), which will change boiler functionality without changing the physics equations (which describe basic physics facts about the essential nature of the actor in question), but will change the value of the Computed Properties 415. Behavior 330A can be thought to be the answers to the equations in the Computed Properties 415, which describe how the different parts of the system interact.

Figure 5:
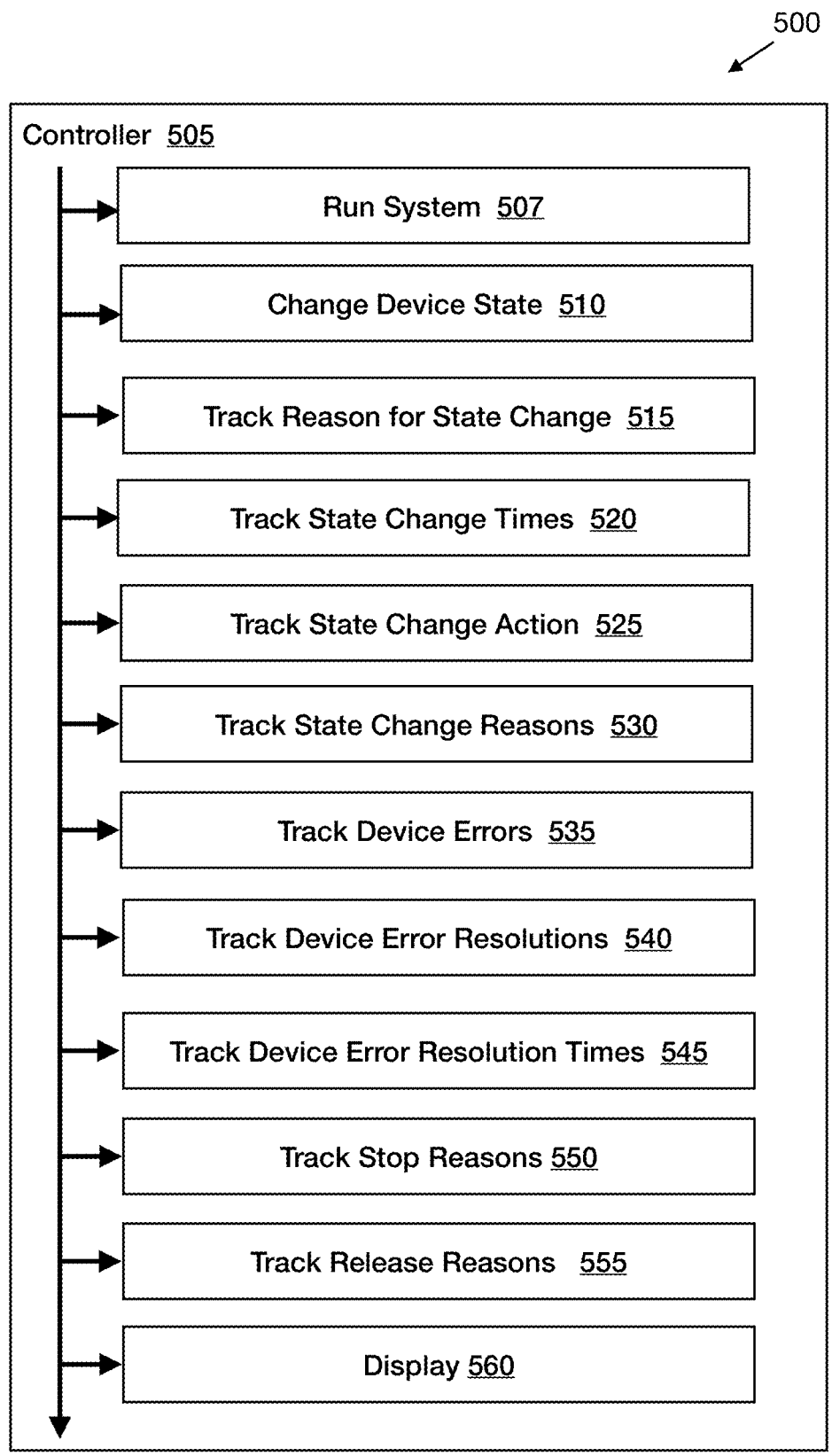
FIG. 5 depicts a flowchart showing types of tracking that systems described herein can perform in conjunction with which described embodiments can be implemented.

FIG. 5 illustrates a method 500 that describes actions that can be taken by the controller 505, and actions that can be tracked by the program 150, and read as results after being translated into human-readable language 255. The operations of method 500 presented below are intended to be illustrative. Technical methods shown in the Figures or otherwise disclosed will be performed automatically, e.g., by a computer program in memory 130 run on a processor within computer hardware 115. A human user may launch a program stored in memory 130 to generate semantic labeling, use semantic labeling analysis, or display the results of semantic labeling analysis 400, leading to a mix of manual and automatic actions, although no entirely manual methods are contemplated herein. Users may instigate other steps as well. Steps in an embodiment may also be done in a different order than the top-to-bottom order that is laid out in FIG. 5.

Zero or more illustrated steps of a method may be repeated, may be with different building plans, device instances, locations, and so forth. Steps may be performed serially, in a partially overlapping manner, or fully in parallel. In particular, the order in which the flowchart 500 is traversed to indicate the steps performed during a method may vary from one performance of the method to another performance of the method. The flowchart traversal order may also vary from one method embodiment to another method embodiment. Steps may be omitted, and/or repeated. Steps may also be be performed on one or more controllers that use a distributed operating system to communicate, or otherwise depart from the illustrated flow, provided that the method performed is operable and conforms to at least one claim.

A digital twin can be comprised of digital twin versions of devices, with the devices described as an actor type 300C, that are affected by quanta of various types. The digital twin version of the device is placed in an interconnected net (as described with reference to FIG. 3B and the surrounding text.) When an event happens in the digital twin that is to be recorded, the digital twin receives a signal that an error has occurred, e.g., the boiler shut off. One may look inside the digital twin representation of the boiler, determine its actor and quanta, describe the values of the quanta (no water, e.g., a fluid quanta), walk the network connection graph to determine where the quanta comes from (e.g., discover the intake valve), determine values of the intake valve actor (e.g., determine that the water quanta was too hot, so intake valve actor was shut off), and so on. These actions are able to be performed because the system understands what the devices do, and so can make what appears to be intelligent decisions about them. While discovering all this information, the accumulated knowledge discovered can be recorded and reported. This allows the collection of information about the system that is otherwise very difficult to acquire, such as behavior 330A.

A controller 110 is operationally able to control the devices 205, 210, 215 This is the nature of the controller-device relationship. Further, the digital twin can run concurrently with the controller. The controller keeps track of device states and more when it runs a system 507. A device is connected to a controller in such a way that the controller can change the state of the device 510 (such as by turning it on and off, changing a setting, can turn the device to an intermediate value (such as "low"), can turn the device on until a condition is met (such as "fill tank 50% full"), etc.). The controller can also track the reason for a state change 515. The digital twin can not only track along with the controller, the actions of the devices (e.g., on, off, etc.) but also, the reason for the actions. In some cases, this is due to the knowledge contained within the digital twin. Examples of this include a thermostat (a different device) being turned up by the controller, so the air conditioner associated with the location of the thermostat turning on. As the controller is attached to both devices, (or is a part of a networked system with multiple controllers that are, together attached to both devices), and more than that, understands the nature of the devices and the actions taken by the devices, the program 150 has access to information necessary to determine the reason for the state change. The controller can also track the state change times 520, by, e.g, being the one that ultimately triggers (or notices) the state change. As such, the controller can mark down the time the state change happened.

In some instances, the controller can track the action 525 that caused the state change. For example, if a sensor in a room records an air quality value out of allowable range, this could trigger the controller to turn on an air purifier. The controller can keep track that a specific sensor recorded an air quality value of X, and in response, the controller turned on the air purifier at time y. In some embodiments, the controller does not directly turn on the state change device, such as an air purifier, but still is aware of the sensor readings, and that the state change device has been turned on, turned off, or modified in some other way. These actions may be directed by the digital twin and/or recorded by the digital twin.

Reasons for the state change 530 can also be tracked. With reference to FIG. 6, a display screen 600 is shown 600 that shows state change tracking. At 605, a state change action is shown, in this case, a priority interrupt on zone #1. The reason given is that a chosen comfort level (e.g., chosen temperature, humidity, etc.) had been reached. At 610, the priority is released. Some other actions include "system test," "system stop," "comfort level reached," and "solar thermal system." Other actions are possible, as well.

Figure 7:
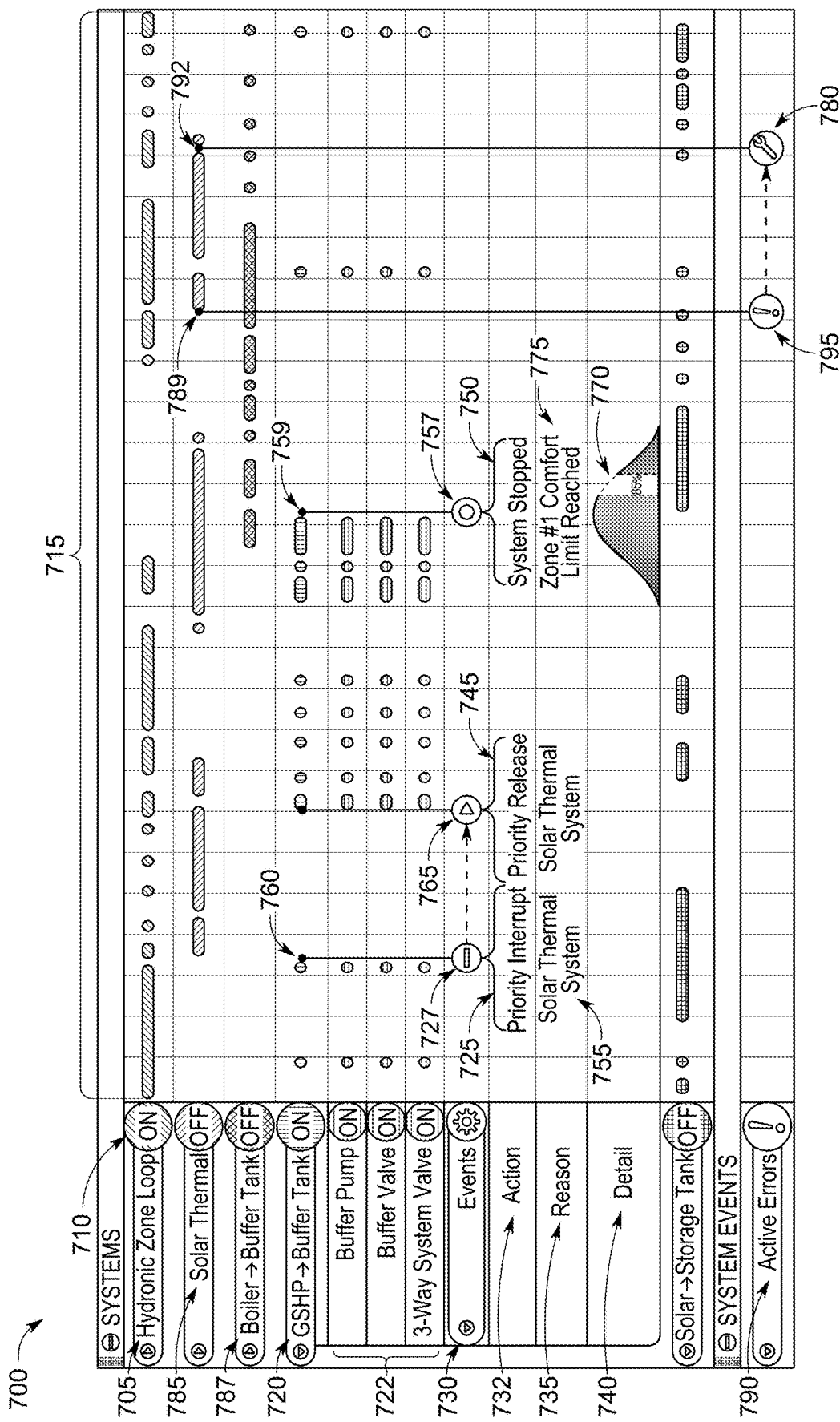
FIG. 7 discloses a possible screenshot describing some state change actions.

Device errors 535 can also be determined and tracked. One implementation of device error display can be seen with reference to FIG. 7. The bottom panel—"system events" shows active errors 790. In this embodiment the errors are listed as an exclamation point icon, 795 with a line 789 drawn to the time (not shown) and system 785—solar thermal—in which they occurred. Device errors resolutions 540 can also be determined and tracked. FIGS. 7 at 780, 790, and 795 show an embodiment of tracking device error resolutions. Device errors resolution times 545 can also be determined and tracked. When the system is stopped (e.g., priority drop), and what the cause of such a stop is 550 can also be determined and tracked. An example of this is shown with reference to FIGS. 7 at 50, 757, 759, 770, and 775. The GHSP buffer tank 759 is stopped 757. Reasons for a system release 555 (e.g., priority release) can also be determined and tracked. The GHSP buffer tank 759 was stopped because the Zone #1 comfort level being reached. Actions 510-560 (e.g., simulation of device actions in the digital model), and other actions, may be displayed 560. The display may be concurrent with the system being run 505, or may be displayed after the system is stopped. These may be displayed on a display screen 125 or on another suitable display device. One way these may be displayed is by displaying simulated space behavior from a first time to a second time.

III. Exemplary Embodiments

Figure 6A:
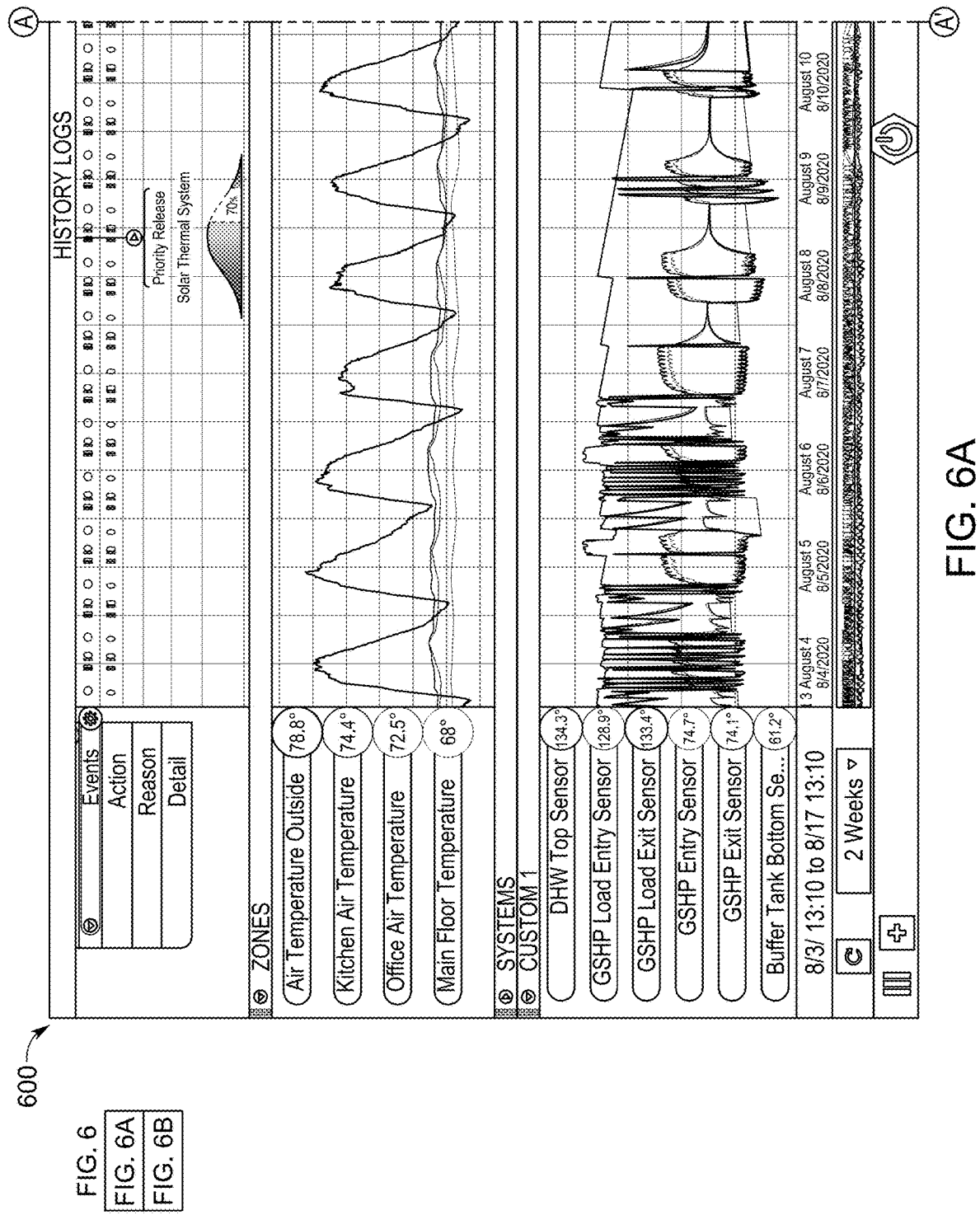
FIG. 6A discloses a screenshot describing some state change actions.
Figure 6B:
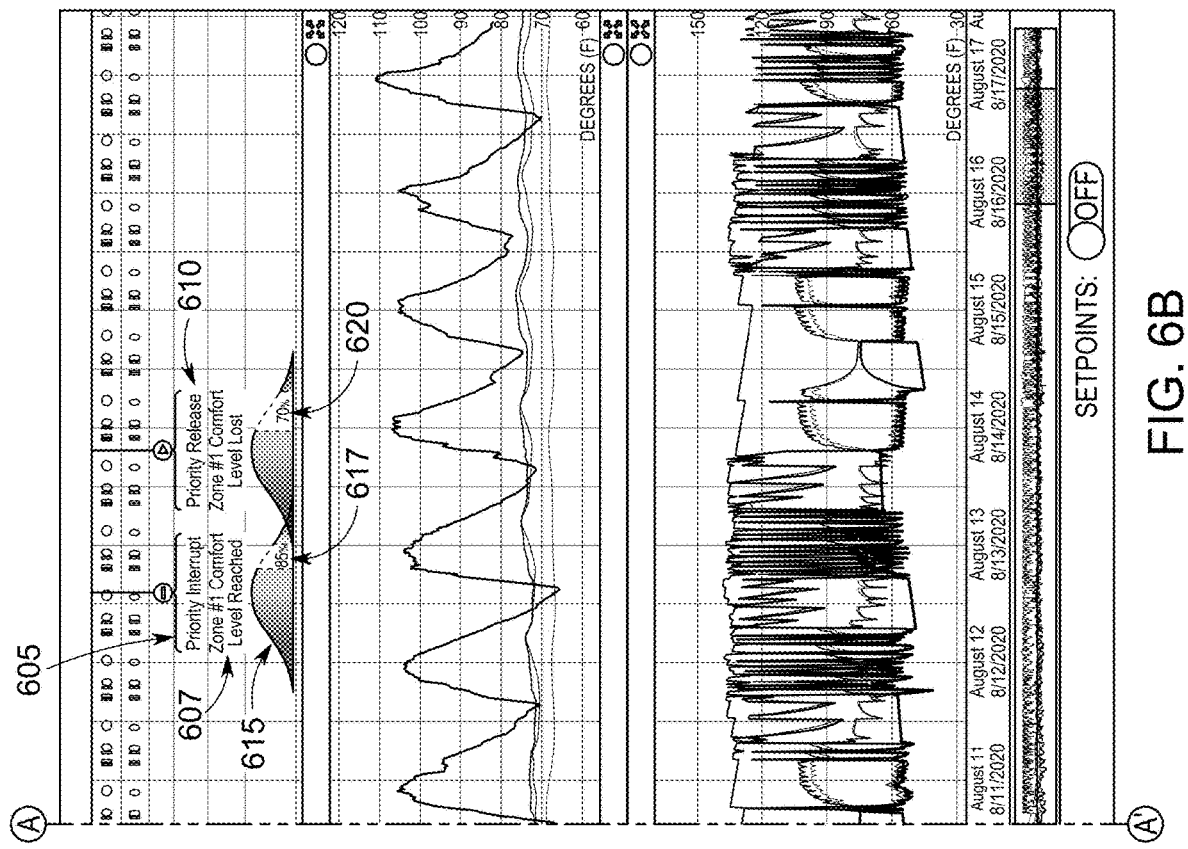
FIG. 6B is a continuation of FIG. 6A that discloses a screenshot describing some state change actions.

FIG. 6A and FIG. 6B represent the same figure divided along the vertical line that runs from A to A' in both drawings. They disclose an exemplary screenshot 600 describing some state change actions and their physical display. In some instances, the controller can track an action 525 that caused a state change. Reasons for the state change 530 can also be tracked. A state change action is displayed; for example, a priority interrupt 605 on zone #1 607. A reason 530 is given as well: a chosen comfort level (e.g., chosen temperature, humidity, etc.) had been reached 607. When the chosen comfort level state change action is shown, the achieved comfort level may also be displayed graphically 615, 620. In some embodiments, as shown here, the possible comfort levels are displayed as a bell curve, with the comfort level that has been achieved shown as a percentage, 85% 617. Other embodiments may display the data in a different manner, such as a different sort of graph, a table, etc. At 610, the priority interrupt is released, for the reason given that the comfort level is no longer optimal, e.g., "Comfort Level Lost." The graphics now show the comfort level at 70% 620, out of the desired comfort level. Some other reasons for change actions that can be tracked are possible. For example: "System Stopped," "System Test," "Comfort Level Reached," and "Solar Thermal System."

FIG. 7 discloses a screenshot 700 displaying details of several systems. A hydronic Zone Loop 705 system is shown, with an indication 710 of its state: it is currently "on." Bars, on the Hydronic Zone Loop line 715, show the times during the model simulation that the hydronic zone loop 705 was on. A solar thermal system (off) 785 and a boiler buffer tank (off) 787 are also shown, along with a ground heat source buffer tank 720. Opening up the GHSP Buffer Tank drawer exposes three different trackable/controllable components of the GHSP Buffer Tank 722, the Buffer Pump, the Buffer Valve, and the 3-Way System Valve. Opening up the events drawer 730 shows more details about why the specific resource performed actions. In embodiments, the drawer is divided into three sections: "Action" 732, "Reason" 735, and "Detail" 740. Other divisions are also envisioned. Three events are shown for the pump, an interrupt 725 (marked by a "—" 727, a release 745 marked by an arrowhead 765, and a stop 750, marked by an "O" 757. The "Action" section 730 gives the events that caused a change action to be taken: in this embodiment, left to right: a priority interrupt 725, a priority release 745, and system stopped 750. "Reason" 735 gives the reason the event occurred. For example, the priority interrupt shown 755 was caused by the solar thermal system interrupting the buffer tank, as shown by the line 760 from the priority interrupt 727 leading up to the buffer tank 720 line. Different embodiments may show this information in different ways. The solar thermal system then released the buffer tank at a later time 745. The system stopped event 750 was caused, in this case, because zone one reached its comfort level 775; meaning that the action taken by the buffer tank was no longer required. The detail shown for the "system stopped" may give other information about this particular action that the system knows. In this case a bell curve 770 is displayed of the comfort limit showing that the comfort limit has been reached at the 85% level, meaning within the various states that various entities and people have asked for, 85% of them have reached the comfort that they desire (in this particular instance). This particular figure does not show time but in many embodiments time is included as shown for example, in FIG. 8 at 820. Active errors 790 are also shown, including the time the error started 795 (in this embodiment indicated with an exclamation point), the system in which the error occurred (Solar Thermal 785, as indicated by the line that starts at 789 and ends at 795), and the time the error was fixed 780 (in this embodiment indicated with a wrench). The system that the error occurred on is also connected with a line 792 to the fixed notation (e.g., the wrench 780).

Figure 8A:
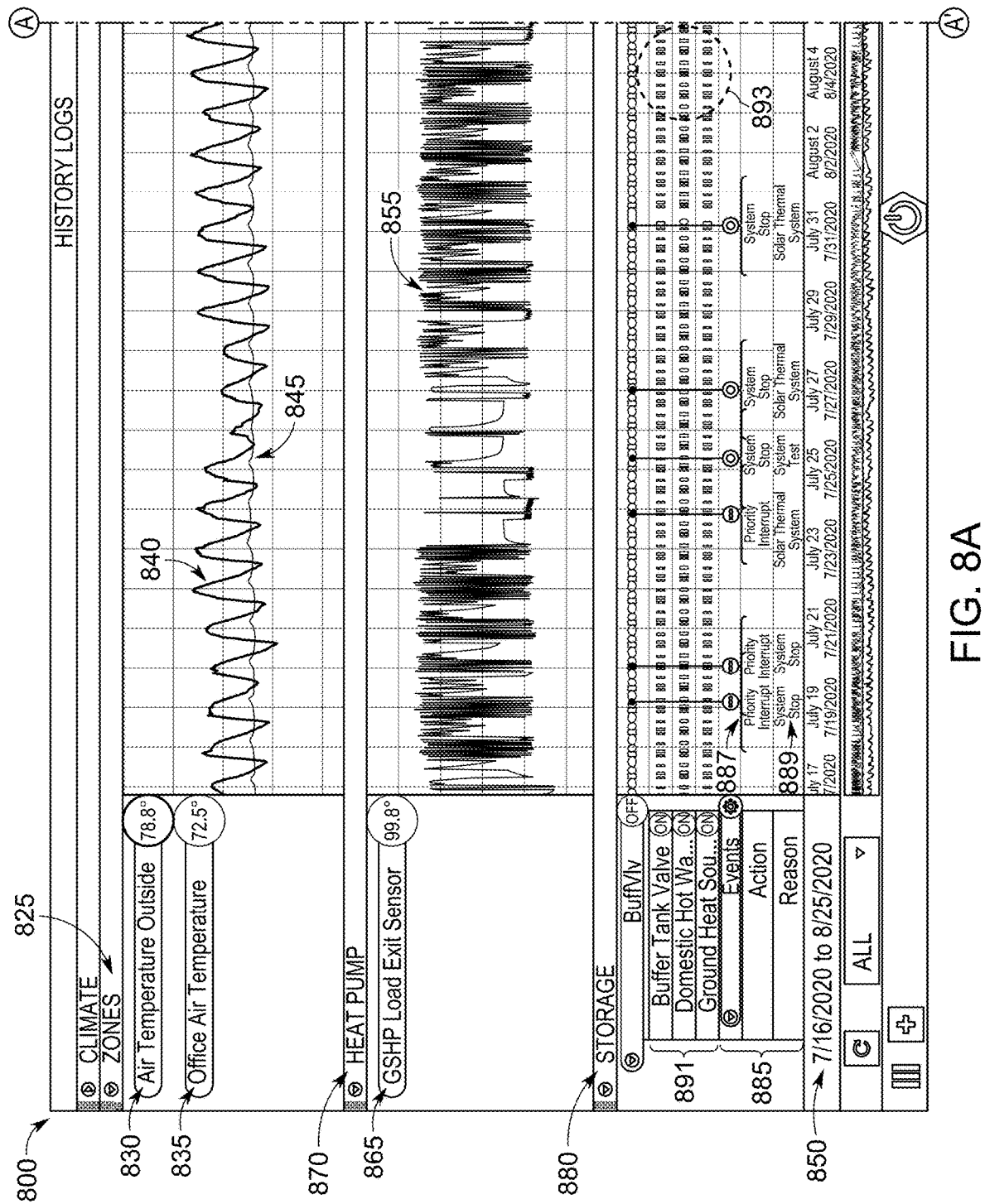
FIG. 8A discloses a screenshot displaying projection of actions into the future.
Figure 8B:
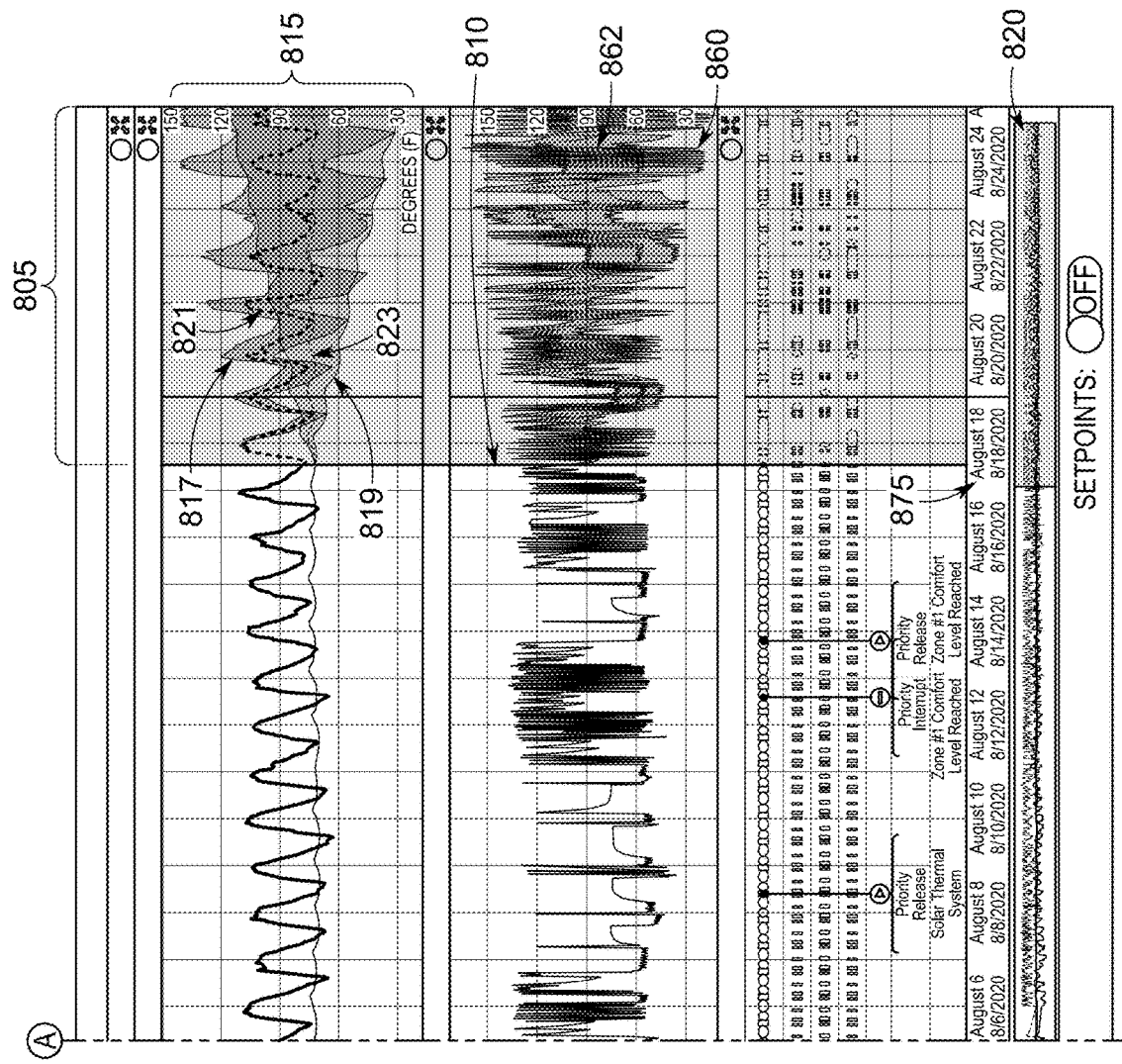
FIG. 8B is a continuation of FIG. 8A that discloses a screenshot displaying projection of actions into the future.

FIG. 8A and FIG. 8B represent a single figure divided along the vertical line that runs from A to A' in both drawings. These two figures disclose a screenshot 800 displaying, among other things, projection of actions into the future. The future time behavior, which may comprise a cone of uncertainty, projected values, etc., may be calculated by programs running in connection with the controller, running on a main computer system, running offsite, etc., and using machine learning and other artificial intelligence techniques, is discussed with reference to patent application Ser. No. 17/228,119, filed Apr. 12, 2021, and hereby incorporated by reference in full. This future knowledge can be displayed. A future line 810 marks the start of everything to the left of that line as historical information, while the information 805 to the right of the line has been projected into the future. Because this is a future projection, it is by nature uncertain. Cone of uncertainty 815 indicates the possible future outcomes. Close to the current time, projections are assumed to be more accurate, thus the cone is narrow. Further from the the current time we go, the projections are assumed to be less accurate, so the cone of uncertainty widens. Each item in a zone history log 825 (e.g., Air Temperature Outside 830 and Office Air Temperature 835) is represented by a history log which gives a state value for the time shown—Air temperature Outside is shown with the thick line 840, and Office Air Temperature is shown with the thin line 845. Some embodiment may delineate different locations with color, hue, line style, etc. A separate cone of uncertainty may be shown for each zone, as shown here. The Air Temperature Outside 830 is shown by the cone of uncertainty 817, while the Office Air Temperature 835 is shown by the cone of uncertainty 819. Some embodiments may represent the cones of uncertainty in different ways, such as by also drawing the most likely path (shown at 821 for the Air Temperature Outside 830, and at 823 for the Office Air Temperature 835) as is also done here. Other methods are also envisioned.

One of the resources that the exemplary embodiment has logged is a Heat Pump 870. In some embodiments, heat values for the pump GHSP Load Exit Sensor 865 are shown 855 for the given time period 850, which includes future time starting halfway through Aug. 17 875. In the future time shown, e.g., to the right of the line at 810, the potential values for the heat pump are shown as the shaded area 860. The most likely heat pump value is shown with a line 862. Since potential values into the future are known (to a certain extent) for resources that the controller will be controlling (to a certain extent), computer programs 150 within the controller 110 or situated elsewhere may be able to use this knowledge to plan the upcoming resource allocation ahead of time to achieve the greatest efficiency, thereby saving up to 30% of the energy expended.

Figure 9A:
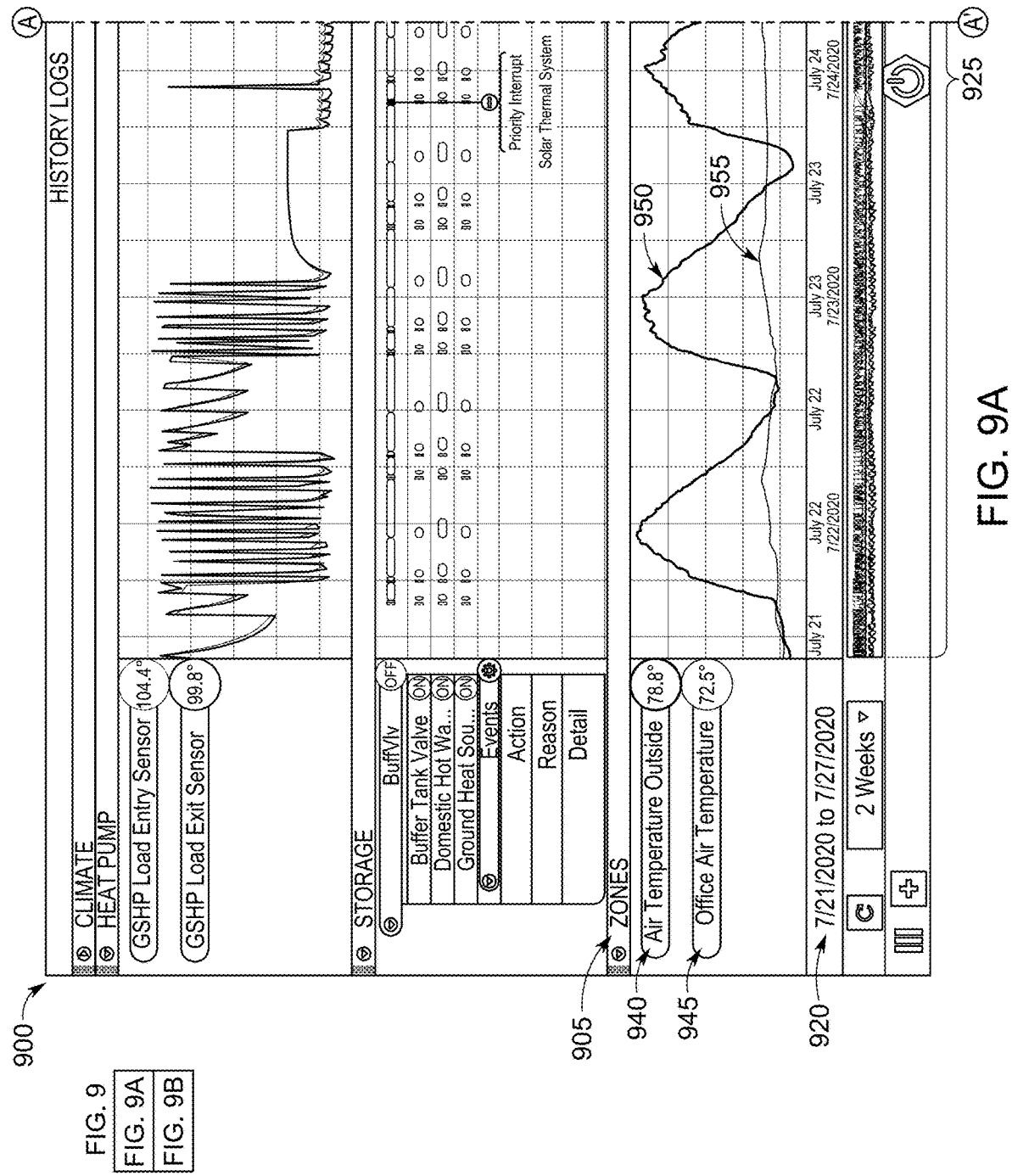
FIG. 9A discloses a screenshot that displays state information over time.
Figure 9B:
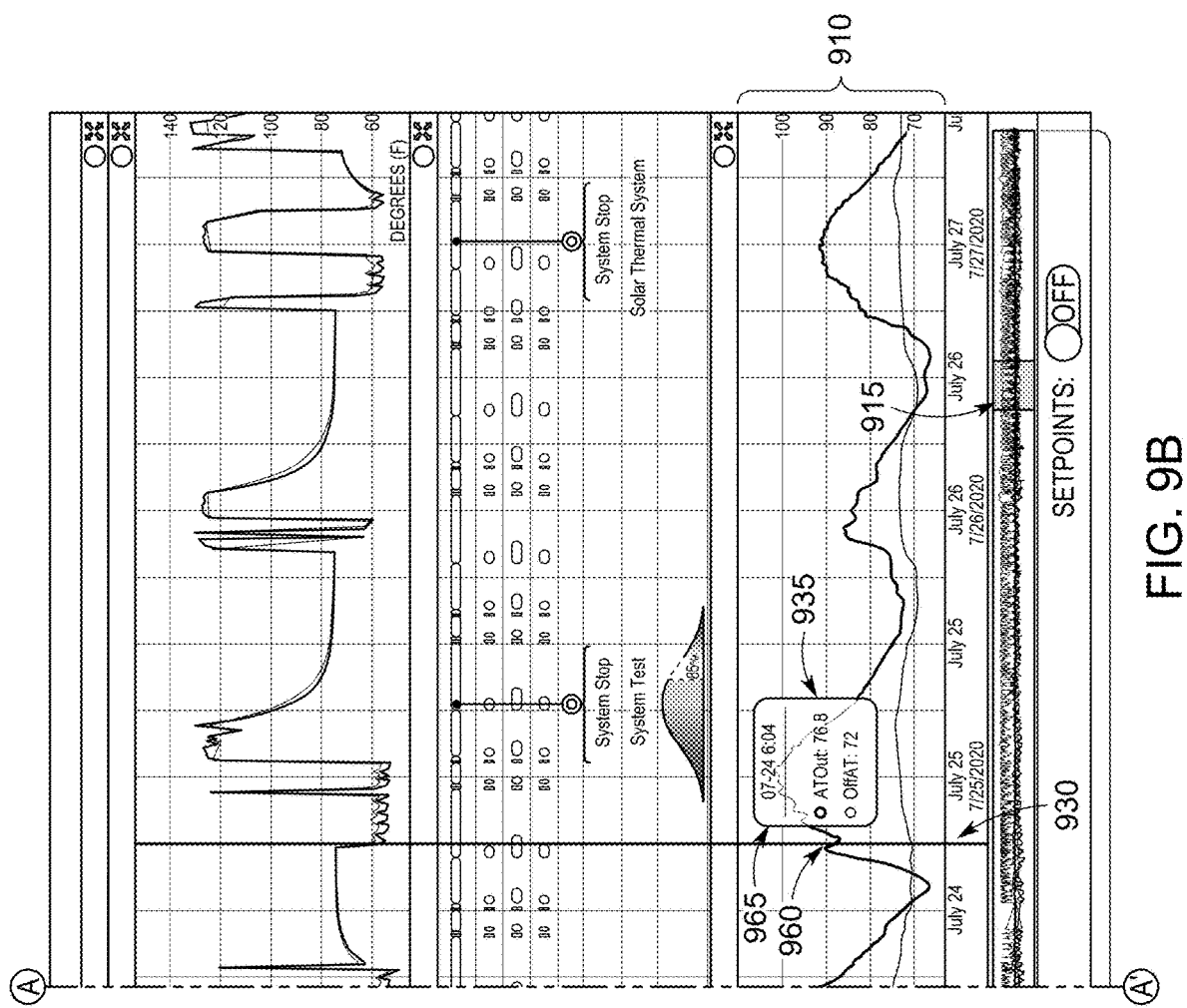
FIG. 9B is a continuation of FIG. 9A that discloses a screenshot which displays state information over time.

FIG. 9A and FIG. 9B represent a single figure divided along the vertical line that runs from A to A' in both drawings. These figures disclose a screenshot 900 that displays, among other things, state values over time. In some implementations, the physical space is divided into zones, and the controller is configured to display state per zone over a given time. In this simple illustrative embodiment, a physical space has been divided into two zones 905, Air Temperature Outside 940 and Office Air Temperature 945. The lower display panel 910 displays the state of each zone (in this case, temperature), as a graph line (in a separate color, or a separate line type, or a different method) for a period of time 920, in this case, Jul. 21, 2020 to Jul. 27, 2020. Within the lower display zone, the line 950 shows the outside temperature 940, and the line 955 shows the office temperature. This time shown in the lower display panel is only a portion 915 (shown shaded) of the entire timeline 925 that is able to be viewed. Specific values for the zones at a specific time, e.g., a location on a history log line, can be selected by selecting a point 960, 930 along the display panel 910 lines 950, 955; which triggers a screen 935 pop up. This pop-up shows the displayed zone values at the chosen time 965. For example, for the chosen time, July 24 at 6:04 965, the Office Air Temperature is 72, and the Air Temperature Outside is 76.8.

Figure 10A:
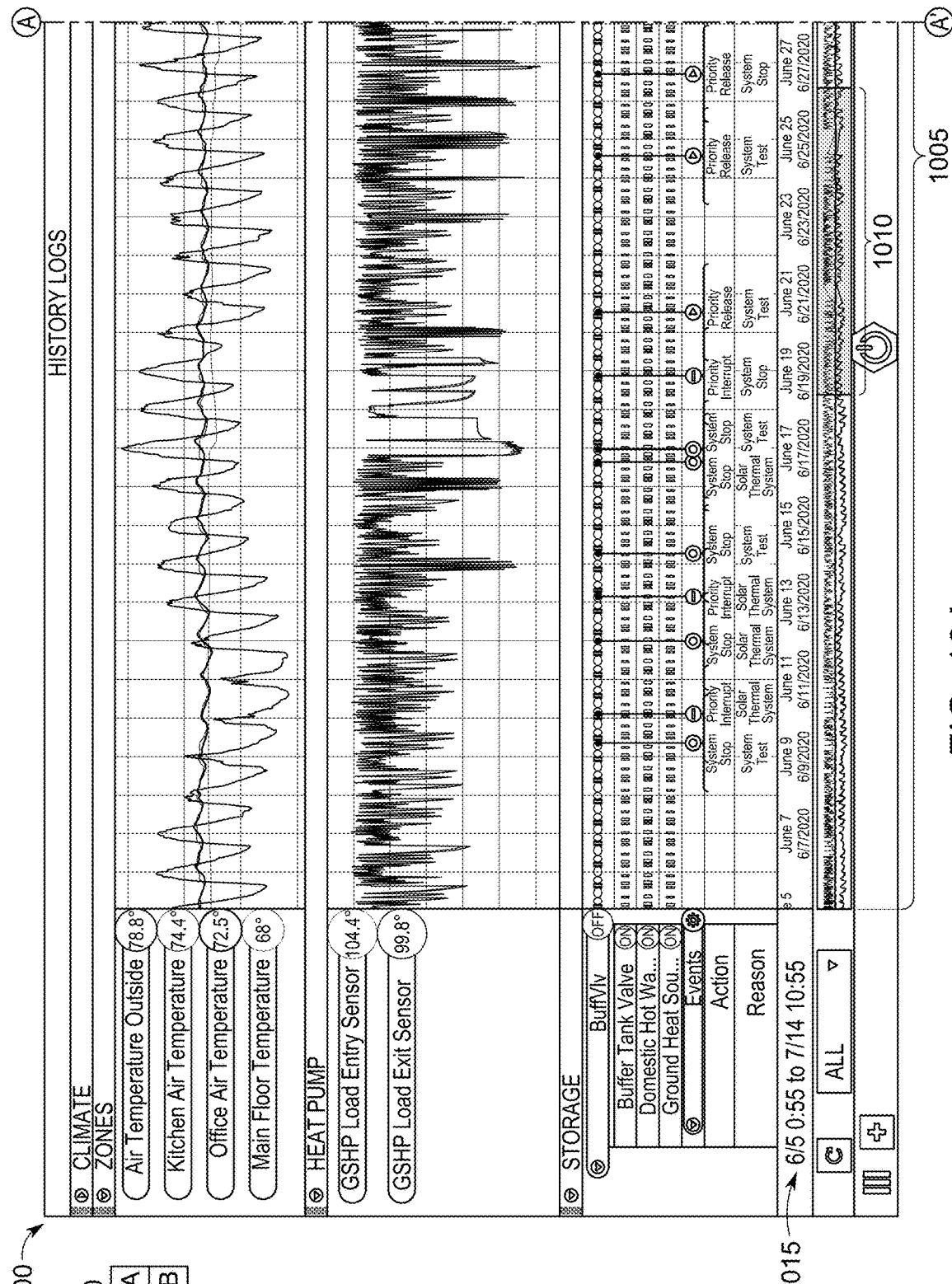
FIG. 10A discloses a screenshot that displays a given time section.
Figure 10B:
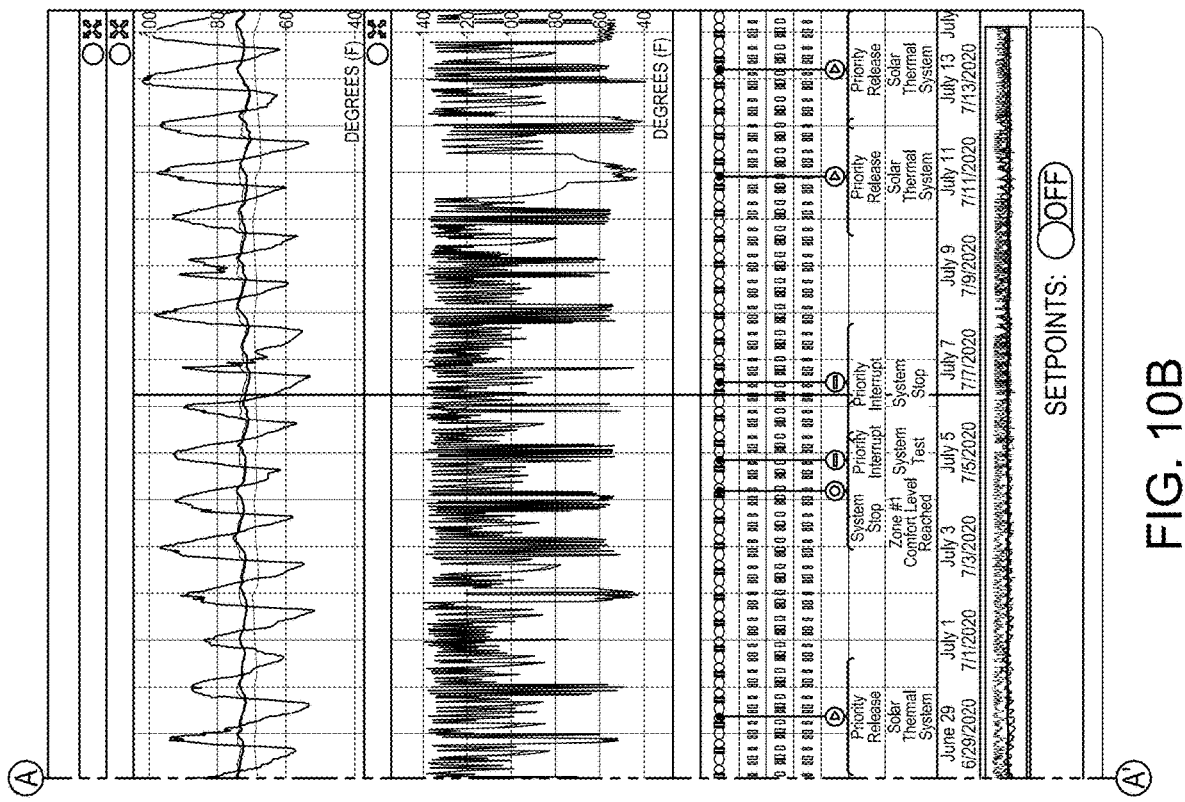
FIG. 10B is a continuation of FIG. 10A that discloses a screenshot which displays a given time section.

FIG. 10A and FIG. 10B represent a single figure divided along the vertical line that runs from A to A' in both drawings. These two figures disclose a screenshot 1000 that displays, among other items, a given time section. In some implementations, the display screen can be zoomed to display a larger or smaller section of the given time in greater detail. In the illustrative example shown 1000, a labeled bar 1005 displays an available timeline, or portion of an available timeline. The timeline can be a time-scale, an indication of events, or another indication. Within the larger stretch of available time, e.g., 1005, a smaller timeframe (here a shaded bar) 1010 can be viewed. In this illustrative example, this bar (which may be a different color, a different texture, etc.) can be scrolled along the larger time indication, with the screen displaying the time indicated by the smaller bar—in this instance, time displayed runs from 6/5 0:55 to 7:14 10.55 1015. This bar can also be shrunk, to show a smaller amount of time (which may be in greater detail). An example of this is shown in FIG. 9, at 915, where a shortened bar can be viewed.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

We claim:

1. A system comprising:
a controller, display screen, and devices, the controller comprising computer hardware and memory, the controller operationally able to control the devices, the controller operationally able to track the devices;
a computer program in the memory configured to display, on the display screen, at least one of:
state of the devices over a given time, an event associated with at least one of the devices, length of time of the event, an action associated with the event, or detail associated with the event;
a digital twin comprising a neural network with nodes modeling devices in a physical space, the nodes arranged with reference to connections between the devices, at least one of the nodes comprising at least one property and at least two computed properties;
wherein the controller operationally able to track the devices comprises tracking device errors;
wherein at least one of the device errors is tracked through more than one device using the digital twin; and
wherein at least one node within the digital twin has an actor type and is acted on by a quanta type to model behavior of an associated device.

2. The system of claim 1, wherein the digital twin is operationally able to simulate the devices from a first time to a second time, and wherein the display screen is operationally able to display simulated physical space behavior from the first time to the second time.

3. The system of claim 2, wherein the event associated with at least one of the devices comprises: a state change associated with at least one of the devices and a state change action that is a reason for the state change.

4. The system of claim 1, wherein the at least one node uses the at least one property and the at least two computed properties to model behavior of the associated device.

5. The system of claim 1, wherein the digital twin uses machine learning methods utilizing utilizes historical data of the devices to simulate the devices from a current time to a future time.

6. The system of claim 1, wherein the actor comprises a producer, a consumer, a transformer, a transporter, a store, a router, a mixer, a path, or a branch.

7. The system of claim 1, wherein the actor interacts with a quanta.

8. The system of claim 1, further comprising the devices comprising a first device connected to a second device connected to a third device;
   the nodes comprising a first node representing the first device connected to a second node representing the second device, the second node connected to a third node representing the third device; and
   wherein the connection between the first device and the third device is determined through the connection between the first node and the second node.

9. The system of claim 8, wherein the connection between the first device and the third device can be determined through the connection between the first node and the second node and the connection between the second node and the third node.

10. The system of claim 9, wherein the connection between the first node and the second node is represented by a quanta.

11. The system of claim 9, further comprising a second property of the first node and wherein the property of the first node is used to calculate a first computed property of the first node, and the second property of the first node is used to calculate a second computed property of the first node.

12. The system of claim 9, wherein the first device is a boiler and wherein the first node has an efficiency coefficient property.

13. The system of claim 9, wherein the property and at least one of the computed properties of the second node is interrogated to determine a fault in the first device.

14. The system of claim 9, wherein the property and at least one of the computed properties of the third node is interrogated to determine a fault in the first device.

15. The system of claim 1, wherein the actor comprises a producer, a consumer, a transformer, a transporter, a store, a router, a mixer, a path, or a branch.

16. A non-transitory computer readable storage medium configured with data and instructions that upon execution by at least one processor with programmable memory in a controller computing system having a devices attached thereto, the programmable memory storing instructions for using a digital twin of the devices, when the instructions, when executed by a processor, cause the processor to perform steps including:
   instructions for accessing the digital twin, the digital twin comprising a neural network with nodes modeling devices in a physical space, the nodes arranged with reference to connections between the devices, at least one of the nodes comprising at least one property and at least two computed propertics;
   instructions for running a computer program stored in a memory, the computer program displaying on a display screen, at least one of: state of the devices over a given time, an event associated with at least one of the devices, length of time of the event, an action associated with the event, or detail associated with the event;
   instructions for running tracking errors of the devices;
   wherein at least one of the device errors is tracked through more than one of the devices using the digital twin; and
   wherein at least one node within the digital twin has an actor type and is acted on by a quanta type to model behavior of an associated device.

17. A method comprising:
   accessing a digital twin, the digital twin comprising a neural network with nodes modeling devices in a physical space, the nodes arranged with reference to connections between the devices, at least one of the nodes comprising at least one property and at least two computed properties;
   running, using a processor, a computer program stored in a memory, the computer program displaying on a display screen, at least one of: state of the devices over a given time, an event associated with at least one of the devices, length of time of the event, an action associated with the event, or detail associated with the event;
   tracking errors of the devices;
   wherein at least one of the device errors is tracked through more than one of the devices using the digital twin; and
   wherein at least one node within the digital twin has an actor type and is acted on by a quanta type to model behavior of an associated device.

18. The method of claim 17, wherein the digital twin utilizes historical data of the device to simulate the device from a current time to a future time.

19. The method of claim 17, further comprising:
   the devices comprising a first device connected to a second device connected to a third device;
   the nodes comprising a first node representing the first device connected to a second node representing the second device, the second node connected to a third node representing the third device; and
   wherein the connection between the first device and the third device is determined through the connection between the first node and the second node.

20. The method of claim 19, further comprising a second property of the first node and wherein the property of the first node is used to calculate a first computed property of the first node, and the second property is used to calculate a second computed property of the first node.

* * * * *